(12) United States Patent
Wilkes et al.

(10) Patent No.: US 7,272,121 B2
(45) Date of Patent: Sep. 18, 2007

(54) METHODS AND APPARATUS FOR A MODULAR WIRELESS SYSTEM

(75) Inventors: Joseph E. Wilkes, Middletown, NJ (US); Paul G. Zablocky, Shrewsbury, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 704 days.

(21) Appl. No.: 09/963,844

(22) Filed: Sep. 26, 2001

(65) Prior Publication Data

US 2003/0058818 A1    Mar. 27, 2003

(51) Int. Cl.
*H04Q 7/00* (2006.01)
*H04B 17/00* (2006.01)

(52) U.S. Cl. .................. 370/331; 455/67.11; 455/424; 375/345

(58) Field of Classification Search ............... 370/328, 370/331, 332, 333, 334, 349, 352, 353, 354, 370/355, 356, 401; 455/436, 439, 440, 442, 455/443, 444, 438, 67.11, 424, 426.1, 446, 455/524, 517; 375/346
See application file for complete search history.

(56) References Cited

U.S. PATENT DOCUMENTS

| | | | |
|---|---|---|---|
| 6,147,986 A * | 11/2000 | Orsic ......................... | 370/349 |
| 6,603,972 B1 * | 8/2003 | Sawyer ....................... | 455/442 |
| 6,708,036 B2 * | 3/2004 | Proctor et al. ............... | 455/446 |
| 6,763,007 B1 * | 7/2004 | La Porta et al. ............ | 370/331 |
| 2002/0118656 A1 * | 8/2002 | Agrawal et al. ............ | 370/329 |
| 2002/0141360 A1 * | 10/2002 | Baba et al. .................. | 370/331 |
| 2002/0183089 A1 * | 12/2002 | Heller et al. ................ | 455/552 |
| 2003/0176187 A1 * | 9/2003 | Menzel et al. ........... | 455/432.1 |

OTHER PUBLICATIONS

V.K. Garg and Joseph E. Wilkes, "Wireless and Personal Communications Systems," Prentice Hall, 1996.

Charles E. Perkins, "Mobile IP Design Principles and Practices," Addison-Wesley CommunicationsSeries, 1998.

* cited by examiner

*Primary Examiner*—Afsar Qureshi
(74) *Attorney, Agent, or Firm*—Joseph Giordano

(57) ABSTRACT

Methods and systems are provided for wireless communications using base stations interconnected by a packet network. A base station receives communications from a wireless device in a first cell served by the base station. The wireless device may be handed off from the first base station to a second base station by a two way exchange of information between the first base station and a second base station through the packet network.

20 Claims, 18 Drawing Sheets

METHODS AND APPARATUS FOR A MODULAR WIRELESS SYSTEM

CROSS-REFERENCE TO RELATED APPLICATIONS

The application of Paul Proctor and Paul Zablocky, entitled "Methods and Systems for Adjusting Sectors Across Coverage Cells," application Ser. No. 09/884,649 and issued with U.S. Pat. No. 6,708,036 and the application of Stephanie Demers, Paul Zablocky and Shimon Moshavi, entitled "Method and Systems for Reducing Interference Across Coverage Cells," application Ser. No. 09/884,637 and issued with U.S. Pat. No. 6,771,934, both filed on Jun. 19, 2001 and contain subject matter related to the subject of the present application and for which applicants claim priority under 35 U.S.C 120.

BACKGROUND OF THE INVENTION

The present invention relates to wireless systems, and more particularly, to methods and systems for a modular wireless system.

FIG. 1 illustrates a block diagram of a current cellular system 100. As illustrated, the system includes a mobile switching center (MSC) 120 connected to multiple base station controllers (BSC) 130. The MSC 120 is also connected to other networks 160, a home location register (HLR) 140, and visitor location register (VLR) 150. Further, each BSC is connected to one or more base transceiver systems (BTS) 110. The MSC 120 is typically an automatic system that interfaces the user traffic from a wireless network to a wireline network or other wireless networks. The MSC 120 is also often called the mobile telephone switching office (MTSO) or the personal communications switching center (PSC).

The BTS 110 typically consists of one or more transceivers placed at a single location and terminates the radio path with wireless devices. The BTS 110 may be co-located with a BSC 130 or may be independently located. The BSC 130 is the control and management system for one or more BTSs 110. The BSC 130 exchanges messages with both the BTS 110 and the MSC 120.

The HLR 140 is the functional unit used for management of wireless subscribers by maintaining all subscriber information (e.g., electronic serial number, directory number, international mobile subscriber identity, user profiles, current location, etc.). The HLR 140 may be co-located with a MSC 120, be an integral part of the MSC 120, or may be independent of the MSC 120. One HLR 140 can serve multiple MSCs 120, or an HLR 140 may be distributed over multiple locations.

The VLR 150, which is linked to one or more MSCs 120, dynamically stores subscriber information (e.g., ESN subscriber's, directory number, user profile, etc.) obtained from the wireless subscriber's HLR 140 when the wireless device is located in the area covered by the VLR 150. When a roaming wireless device enters a new service area covered by a MSC 120, the MSC 120 informs the associated VLR 150 about the wireless device by querying the HLR 140 after the wireless device goes through a registration procedure.

The other networks 160 may include other communications networks, such as a public switched telephone network (PSTN), an Integrated Services Digital Network (ISDN), a Public Land Mobile Network (PLMN), and a packet-switched public data network (PSPDN).

In the current cellular system 100, the BTSs 110, BSCs 130 and MSC 120 are hardwired together. That is, they have direct physical connections between each other. As a result, the costs necessary for building such an infrastructure can be prohibitively large, making it difficult, if not impossible, for companies to enter the cellular marketplace.

SUMMARY OF THE INVENTION

Accordingly, methods and systems are provided to address the above and other problems of the prior art. Methods and systems consistent with the invention, as embodied and broadly described herein, facilitate communications using at least a first base station connected by a packet network to a second base station. In accordance with one aspect of the invention, the first base station receives communications from a wireless device in a first cell served by the first base station, and the wireless device is handed off from the first cell to a second cell by a two way exchange of information between the first base station and a second base station served by the second cell.

Now in accordance with another aspect of the invention, a system includes a first base station that controls communications with one or more wireless devices in a first cell, a second base station that controls communication with one or more wireless devices in a second cell, and a packet network connecting the first base station and the second base station. The first base station and the second base station engage in a two way information exchange over the packet network to hand off one or more of the wireless devices in the first cell to the second cell.

DETAILED DESCRIPTION

Reference will now be made in detail to the preferred embodiments of the invention, examples of which are illustrated in the accompanying drawings. Wherever possible, the same reference numbers will be used throughout the drawings to refer to the same or like parts.

Figure 1:
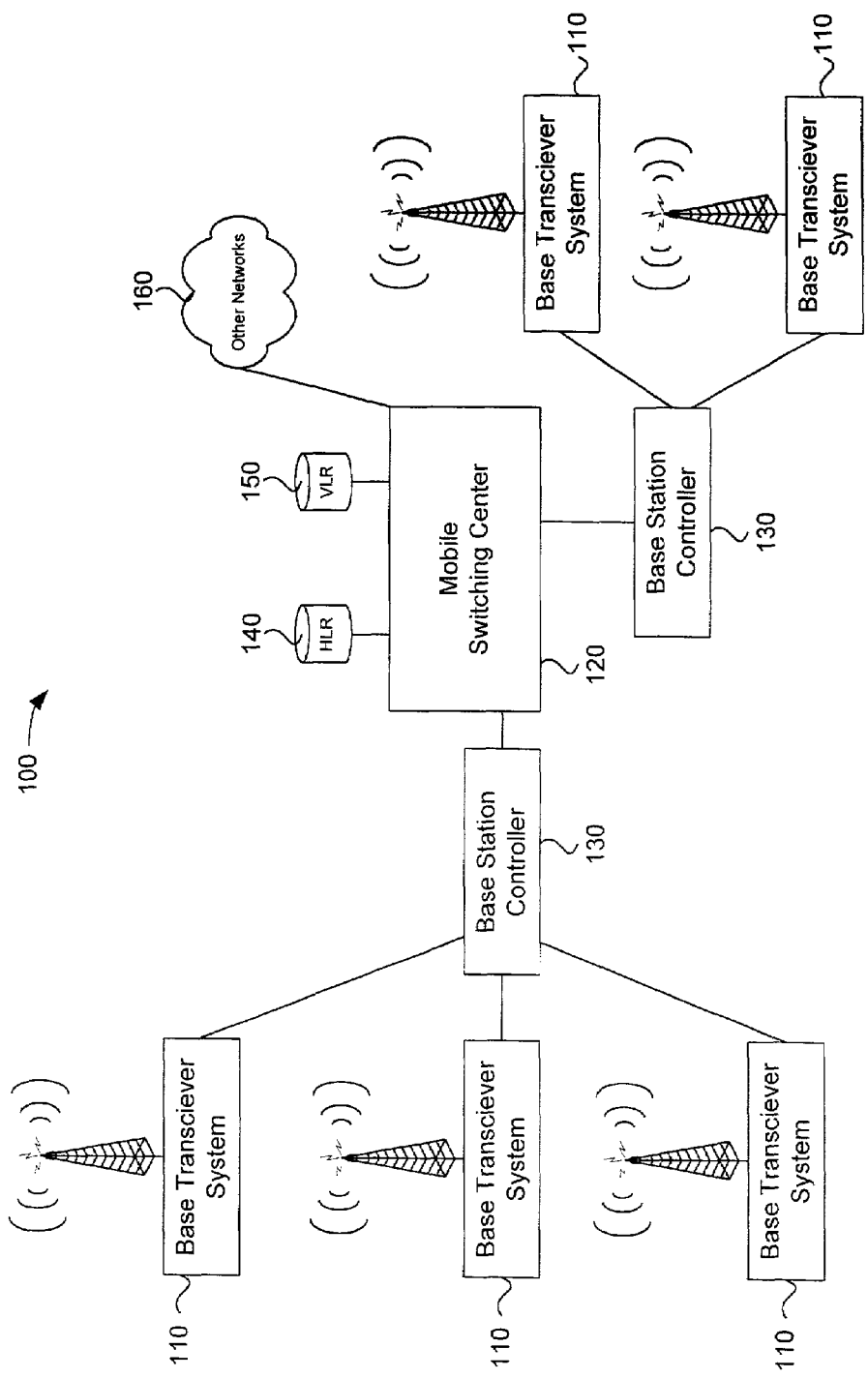
FIG. 1 illustrates a block diagram of a prior art cellular system.
Figure 2:
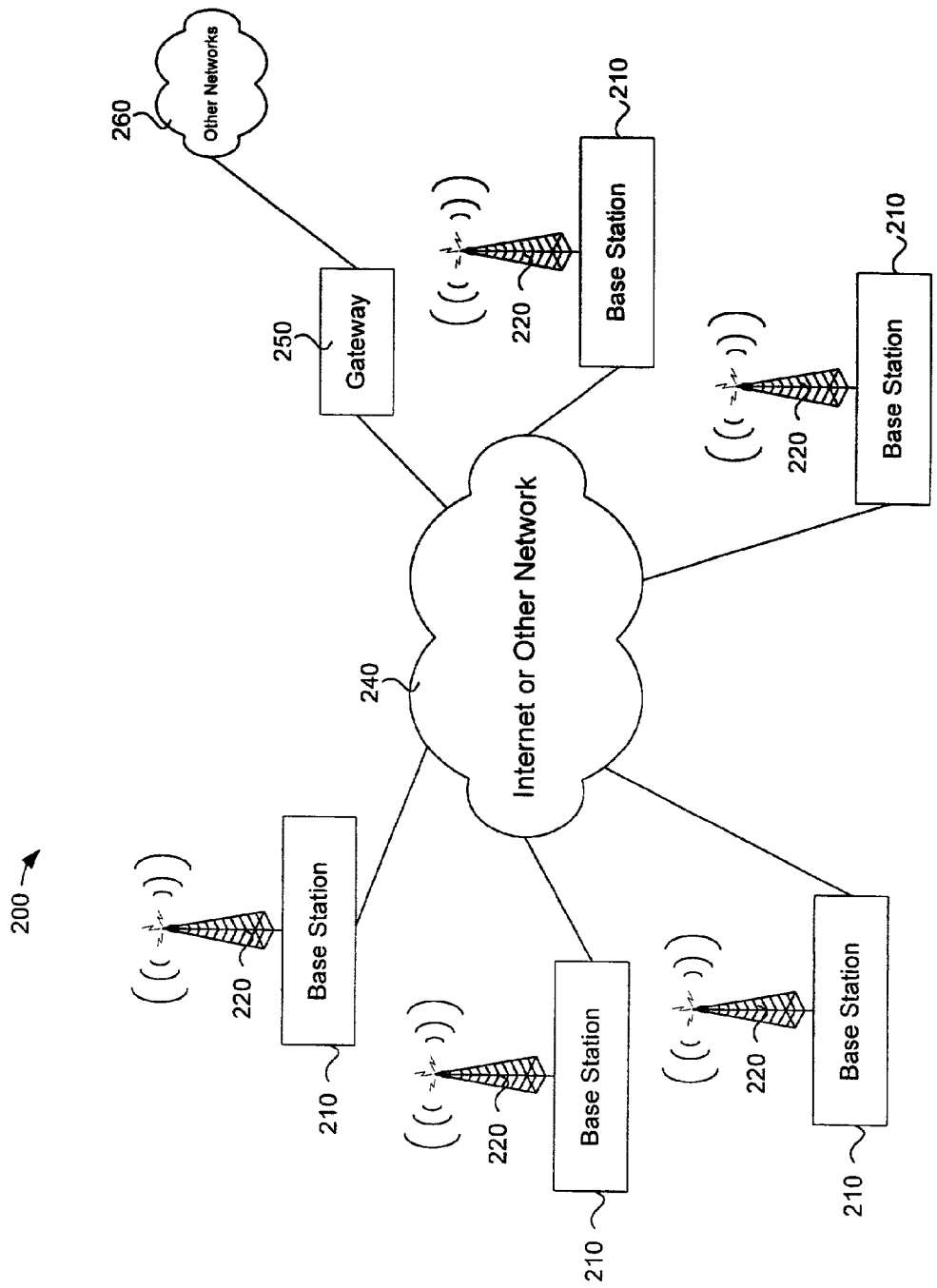
FIG. 2 illustrates a wireless system, in accordance with methods and systems consistent with the invention.

FIG. 2 illustrates a block diagram of a wireless system 200, in accordance with methods and systems consistent with the invention. As illustrated, one or more base stations 210 are connected to a network 240, which may include, for example, the Internet or any other type of network. The base stations 210 may be directly connected to network 240 or may be connected to network 240 through subnetworks (not shown).

As illustrated, each base station 210 is connected to an antenna 220 through which communication is established with wireless devices. Like present cellular systems, each base station 210 communicates with wireless devices located in a particular cell where each cell covers a specific geographical area. The wireless devices (not shown) used to communicate in cellular wireless system 200 may include, for example, a standard wireless phone, a third generation cellular device, or any other type of wireless device.

In cellular wireless system 200, the intelligence that in the prior system resided in the BTSs, BSCs, and MSC may be distributed amongst the base stations 210. For example, each base station 210 may operate autonomously and include intelligence for exchanging information with other base stations for the purposes of adjusting the coverage areas for the base stations, handing off wireless devices from one base station to another, and, when the base station 210 is plugged into the network 240, automatically locating other base stations and configuring itself. Further, each base station 210 may be configured using software programmable on a MultiPC platform. That is, the base stations 210 may not need specific hardware, but rather, all of the base station's functionality may be performed in software using general purpose processors.

Because there is no central MSC or BSC, the wireless system can be grown simply by adding base stations 210 to the wireless system. As such, this solution may be used for both very small and very large configurations. Also, the base stations 210 may use advanced signal processing, such as space time adaptive processing (STAP), multi-user detection (MUD), and multi-user detection across cells (MUDAC). Further, the base stations 210 may use sectored antennas that adapt their direction dynamically to improve network performance.

The base stations 210 may also use standard internet protocols for communicating over the network 240. For example, the base stations may use Mobile IP, DHCP, VPN, etc. to communicate with each other. Also, the base stations may use standard air interfaces, such as, IS-95, cdma2000, UWC-136, UMTS-3GPP-W-CDMA, etc. Further, because standard air interfaces may be used, no changes to existing cellular phones or networks are necessary.

Figure 3:
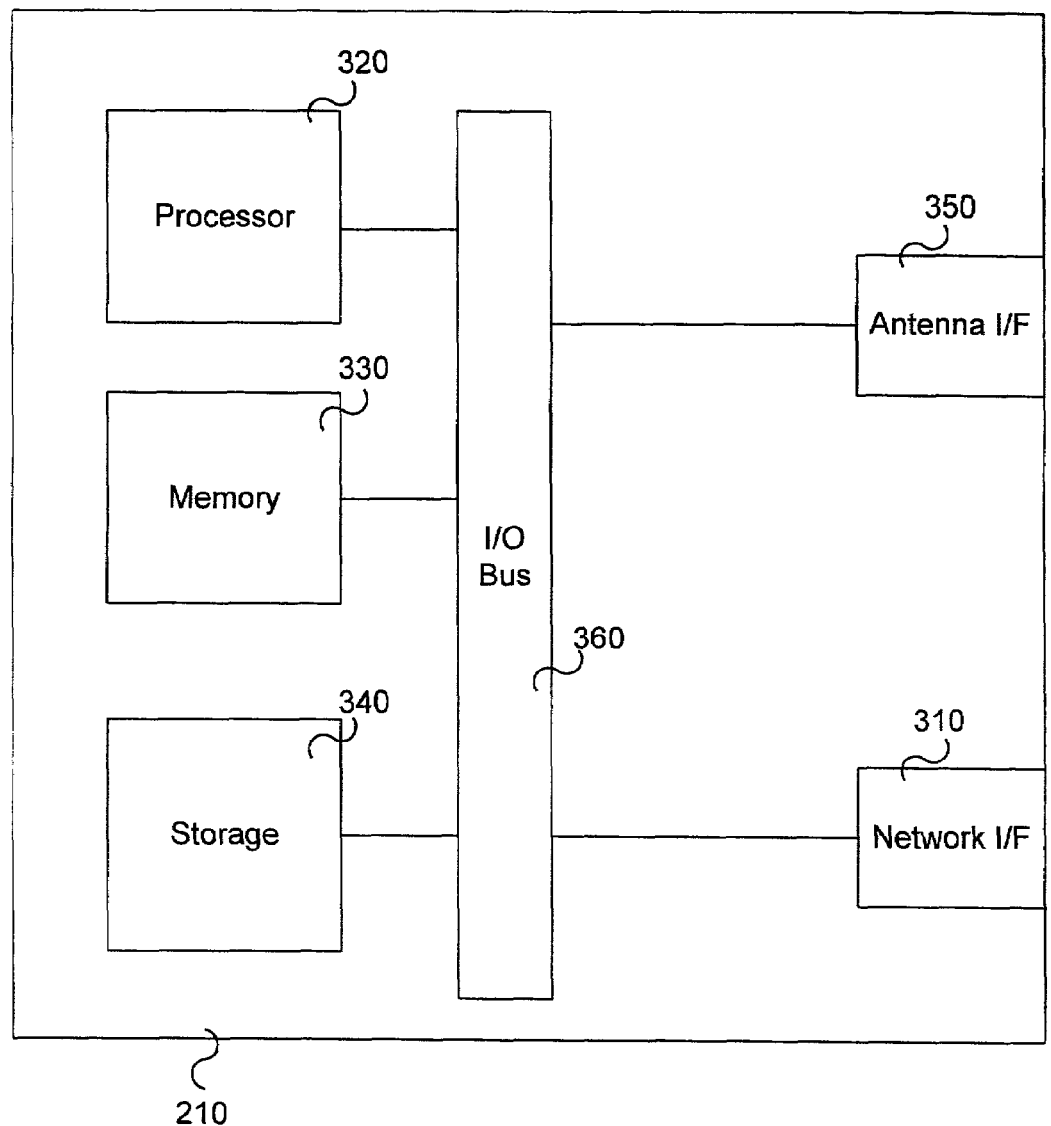
FIG. 3 illustrates a block diagram of a base station, in accordance with methods and systems consistent with the invention.

FIG. 3 illustrates a block diagram of a base station 210, in accordance with methods and systems consistent with the invention. As shown, the base station 210 includes a network interface 310, a processor 320, a memory 330, a storage device 340, an antenna interface 350, and a bus 360. The network interface 310 may be an Ethernet type interface that the base station 210 may use to connect to the network 220. The processor 320 may be any type of processor for performing computer type operations. The memory 330 may be any type of memory, such as a Random Access Memory (RAM). The storage device 340 may be any type of storage device, such as, a hard drive, a CD-ROM, etc. The antenna interface 350 connects the base station to an antenna for communicating with wireless devices. The antenna interface 350 may include a radio transmitting and receiving device (not shown).

As discussed above, each base station may be a plug and play type device. For example, when a base station 210 connects to a network such as network 240, it automatically identifies any other base stations 210 also connected to the network. Then, the base stations 210 communicate with one another to automatically determine the coverage area for the new base station and the existing base stations in the network. Then, the base stations may communicate amongst themselves to accomplish various functions, such as handing off wireless devices from one base station to another.

Figure 4:
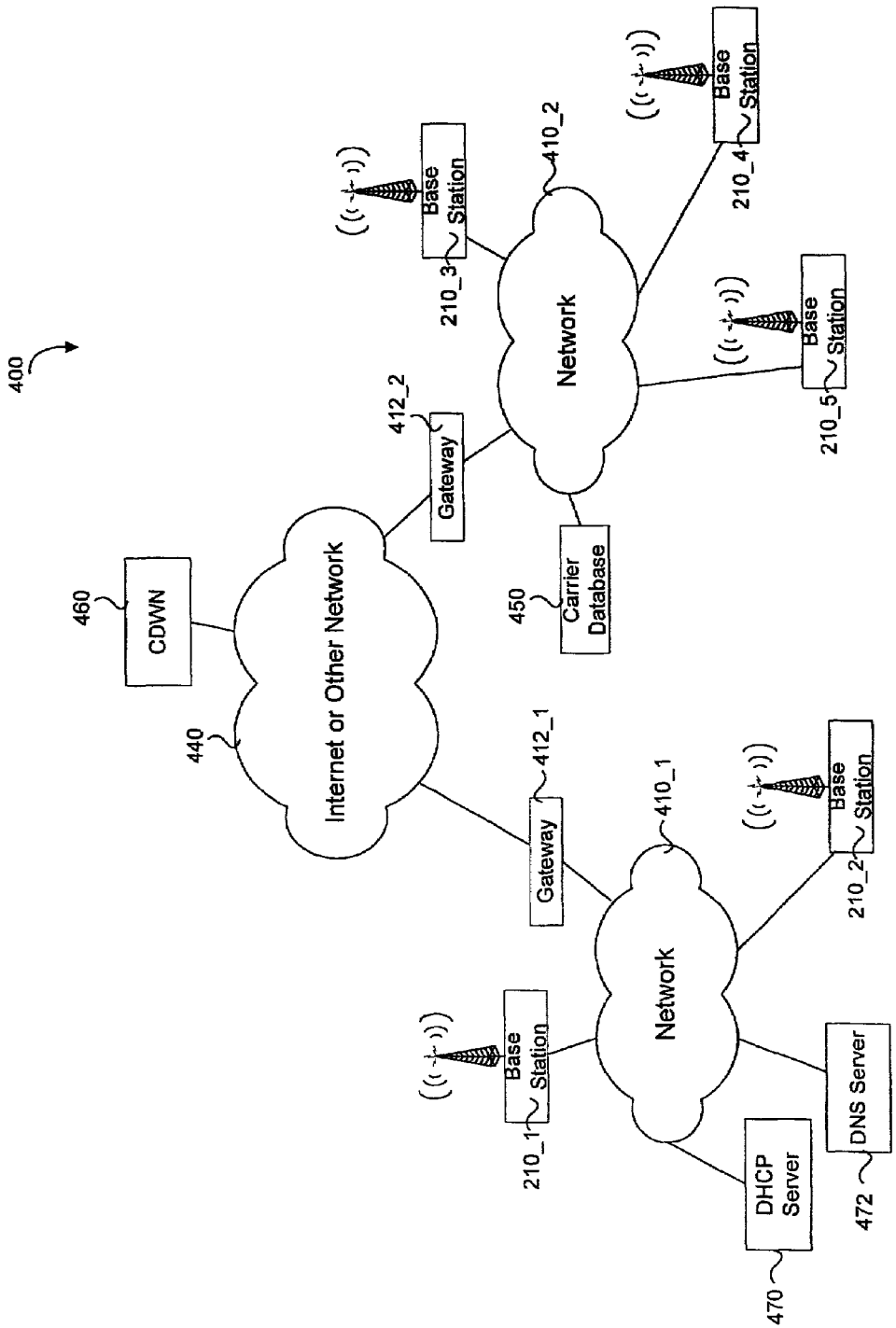
FIG. 4 illustrates a wireless system, in accordance with methods and systems consistent with the invention.

FIG. 4 illustrates a wireless system 400, in accordance with methods and systems consistent with the invention. As illustrated, base stations 210_1 and 210_2 are connected to network 410_1, which is connected to a network 440 through gateway 412_1. Network 410_1 may include a Dynamic Host Control Protocol (DHCP) server 470 and a Domain Name Server (DNS) 472.

Base stations 210_3, 210_4, and 210_5 are connected to a network 410_2, which connects to network 440 through gateway 412_2. A carrier database 450, which connects to network 410_2, stores information regarding the base stations in a carrier's network. For example, the carrier database 450 may store the IP address for each of the base stations in the carrier's network. A carrier refers to a company providing wireless services.

Networks 410_1 and 410_2 may include any type of network, such as, an Ethernet, a Fiber Distributed Date Interface (FDDI) network, etc. Network 440 may also include any type of network, such as the Internet.

The central database of wireless networks (CDWN) 460 stores information regarding the network addresses (e.g. IP addresses) for the carrier databases 450. For example, there may be multiple carriers providing wireless services, such as Bell Atlantic, Sprint, etc. In such an embodiment, the CDWN 460 may store the network address of the carrier database 450 for each carrier. Thus, if a base station needs to locate a carrier database 450 of a particular carrier, it can access the CDWN 460 to obtain the network address for the carrier database 450. The carrier database 450 and CDWN 460 will be discussed in further detail below.

Figure 5A:
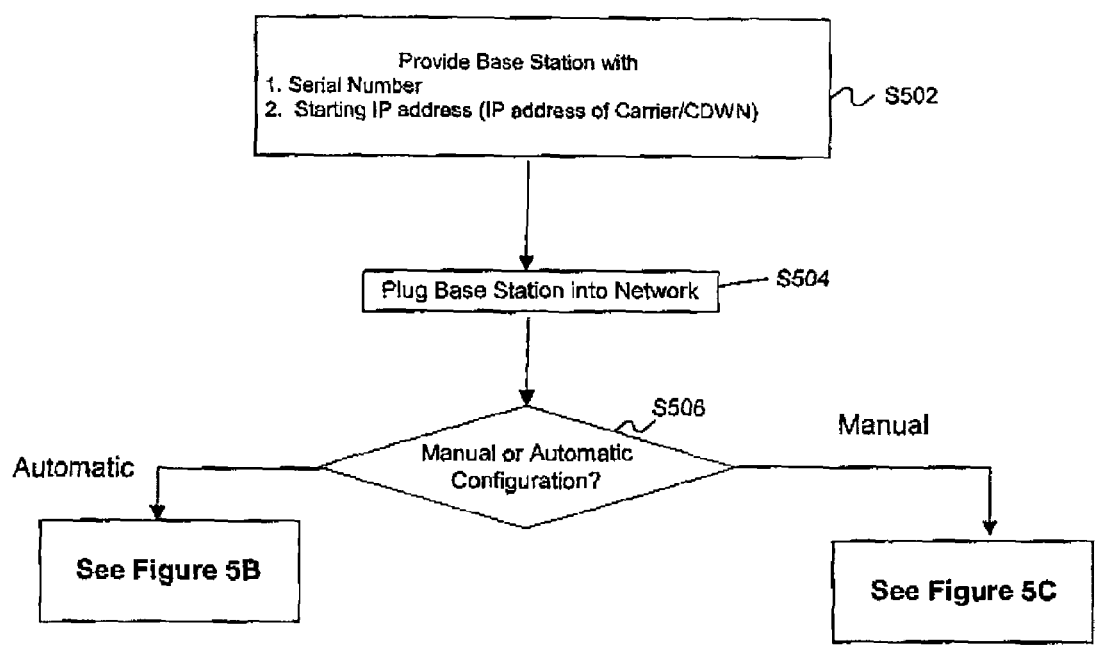
FIGS. 5a, 5b, and 5c illustrates a flow diagram for self discovery by a base station, in accordance with methods and systems consistent with the invention.
Figure 5B:
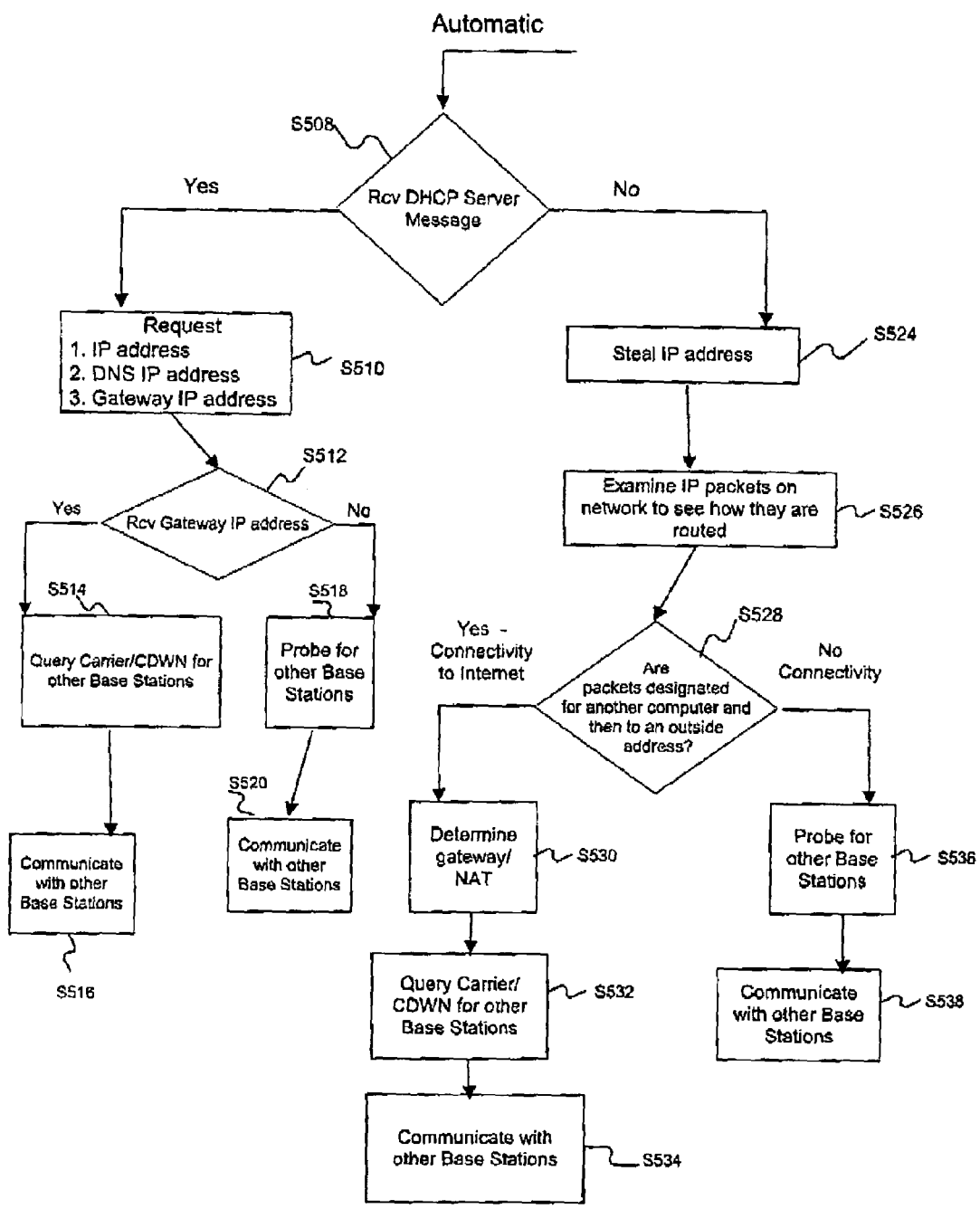
Figure 5C:
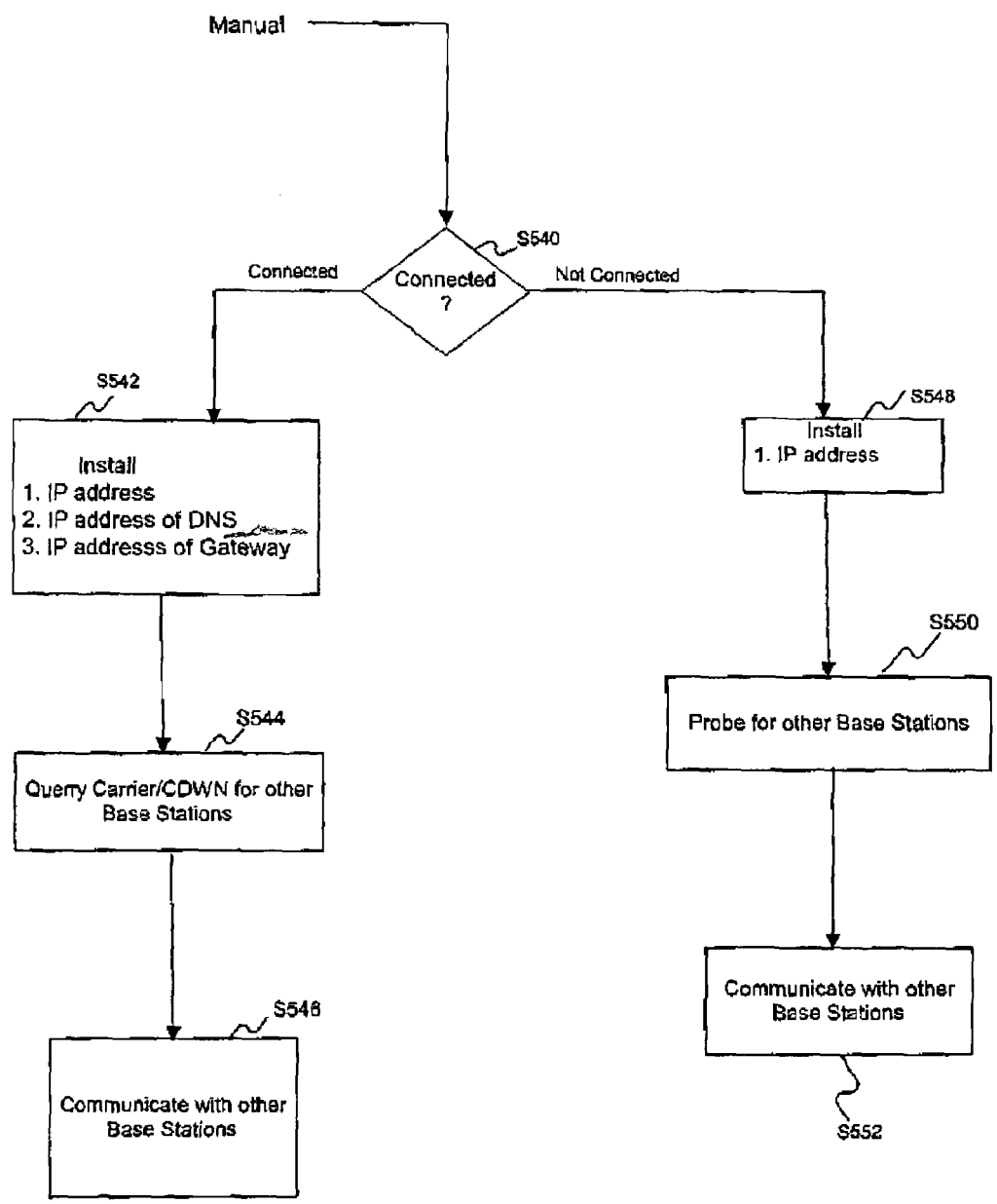

FIGS. 5a, 5b, and 5c illustrates a flow diagram for self discovery by a base station, in accordance with methods and systems consistent with the invention. In this example, it is assumed the base stations communicate using the IP protocol. This flow diagram will be discussed with reference to FIG. 4, where base station 210_1 is plugged into the network 410_1. Further, in this example network 440 is the Internet. As illustrated, the base station 210_1 is first assigned a unique serial number that is programmed into the base station 210_1 and an initial IP starting address (S502). The base station's serial number is used to distinguish one base station from another. The serial number may be used by the CDWN 460 to determine ownership of a base station. The starting IP address is used by the base station to obtain additional information during self-configuration. For example, the starting IP address may include the IP address of the carrier database 450 of the carrier (i.e., the company providing wireless services) using the base station 210_1.

After the base station 210_1 is provided with a serial number and a starting IP address, the base station 210_1 is then plugged into a network 410_1 (S504). The base station 210_1 may then be either manually configured or automatically configured (S506). For example, a base station may be designed such that it is manually configured, automatically self-configured, or provides the installer with an option of either manually or automatically configuring the base station.

If the base station 210_1 is automatically configured, the base station 210_1 may transmit a Dynamic Host Configuration Protocol (DHCP) discover message and then listen for a server offer message (S508). As is known to one skilled in the art, a DHCP server 470 periodically responds to discover messages on the network 410_1 to which it is connected. New devices on the network 410_1 receive the offer message that includes an IP address assignment from the DHCP server 470. Thus, the base station 210_1 may determine that there is no DHCP server 470 on the network if it does not receive the offer message within a predetermined period of time after broadcasting a discover message and may determine that there is a DHCP server 470 if such a message is received.

If the base station 210_1 determines that there is a DHCP server 470 present (i.e., it receives a DHCP server offer message), the base station 210_1 receives in the offer message (1) an IP address for itself 210_1, (2) an IP address for the Domain Name Server (DNS) 472, and (3) the IP address for a gateway 412_1 (S510). That is, the DHCP server 470 provides this information to the base station 210_1.

If the network 410_1 is not connected to the Internet (i.e., there is no gateway 412_1), then the base station 210_1 will not receive an IP address for a gateway 412_1. Thus, the base station 210_1 determines that the network 410_1 is connected to the Internet if it receives the gateway's address from the DHCP server 470, and determines that it is not connected if the base station 210_1 doesn't receive a gateway address from the DHCP server 470 (S512). In another example, the DHCP server may provide the base station with an indication that there is no gateway rather than simply not providing a network address for a gateway.

If the network 410_1 is connected to the Internet 440, the base station 210_1 then contacts the carrier's database 450 to determine the IP addresses for other base stations in the wireless system 400 (S514). If during step S502, the base station 210_1 is provided with the IP address for the CDWN 460, rather than the carrier's database 450, the base station 210_1 first contacts the CDWN 460. In response, the CDWN 460 provides the base station 210_1 with the IP address of the carrier database 450 after which the base station 210_1 contacts the carrier database 450. If, however, the base station 210_1 is initially provided with the IP address of carrier database 450, the base station 210_1 need not first contact the CDWN 460.

After receiving the IP addresses for the other base stations in the wireless system 400, the base station 210_1 contacts the other base stations and begins communicating with them (S516). If the base station 210_1 is the first base station, then it simply waits until another base station is added to the wireless system and contacts the first base station 210_1.

Referring back to step S512, if the base station 210_1 does not receive a gateway address from the DHCP server 470 or the DHCP server 470 informs the gateway 412_1 that there is no gateway, the base station 210_1 assumes that the network 410_1 does not connect to the Internet 440. The base station 210_1 may then search for other base stations connected to the network 410_1 (S518). For example, the base station 210_1 may search for other base stations by sending out a broadcast message over the network 410_1 to which other base stations on the network 410_1 respond. If the base station 210_1 receives a response from other base stations, the base stations may communicate amongst one another (S520).

Referring back to step S508, if the base station 210_1 does not receive a DHCP server offer message after a predetermined period of time, it assumes that the network does not include a DHCP server (i.e., a DHCP server 3_10 is not connected to network 410_1). (S308). The base station 210_1 may then steal an IP address by, for example, listening to the traffic on the network 410_1 and determining from this information the range of valid IP addresses (S524). Then, the base station 210_1 may use an address within this range. In an alternative embodiment, the base station 210_1 uses a manually installed IP address, which may, for example, be installed by whomever plugs the base station into the network 410_1. In yet another embodiment, the base station 210_1 uses the broadcast IP address of the network 410_1.

The base station 210_1 may also examine packets on the network 410_1 to determine how they are routed (S526) by listening to the source and destination IP addresses of packets. The base station 210_1 then determines if there are packets destined for a particular computer, such as a gateway 412_1, and then out on to the Internet (S528). If such packets are identified, the base station 210_1 determines that the network is connected to the Internet 440 and determines the address for the gateway 412_1 (S530).

Next, the base station 210_1 contacts the carriers database 450 using the previously provided starting IP address and request information regarding other base stations in the wireless system 400 (S532). Further, as discussed above, the base station 210_1 may be provided with the CDWN 460 address rather than the address for the carrier's database 450. If so, the base station 210_1 first contacts the CDWM 460, which provides the base station 210_1 with the IP address of the carrier's database 450. Then, the base station 210_1 contacts the carrier's database 450 and requests the information regarding the other base stations in the network 410_1. After which, the base stations may communicate with the other base stations (S534).

Referring back to step S528, if the base station 210_1 does not identify packets designated for another computer and then go out to the Internet, the base station determines that it does not connect to the Internet 440 (i.e., there is no gateway 412_1). The base station 210_1 then searches for other base stations (S536). The base station 210_1 may, for example, search for other base stations by sending out a broadcast message over the network 410_1, to which base stations on the network 410_1 may respond. If the base station 210_1 receives a response from the other base stations, the base stations may communicate amongst one another (S538).

Referring back to step S506, if the base station 210_1 is manually configured, the next step is determining whether or not the network 410_1 to which the base station 210_1 is connected to the Internet 440 (S540). If the base station 210_1 connects to the Internet 440, whomever is configuring the base station 210_1 manually provides the base station 210_1 with (1) the base station's IP address, (2) the IP address of any DNS 472, and (3) the IP address of the gateway 412_1 (S542). Next, the base station 210_1 contacts the carrier database 450, as discussed above, and requests information about the other base stations (S544), after which the base stations may communicate amongst one another (S546).

Referring back to step S540, if the network 410_1 to which the base station 210_1 connects is not connected to the Internet 440, whomever is configuring the base station 210_1 enters the IP address for the base station 210_1 (S548). The base station 210_1 then searches for other base stations by, for example, sending out a broadcast message over the network 410_1, to which base stations on the network 410_1 respond (S550). If the base station 210_1 receives a response from the other base stations, the base stations may communicate amongst one another (S552).

As will be obvious to one skilled in the art, there are numerous other ways a base station could perform self discovery. For example, if the base stations are directly connected to the Internet, the base stations may use a method similar to the method used by routers for self-discovery.

In addition to self-discovery, base stations may determine and adjust their coverage areas automatically by communicating directly amongst themselves. For example, the application of Paul Proctor and Paul Zablocky entitled Methods and Systems for Adjusting Sectors Across Coverage Cells, which was incorporated by reference in its entirety provides methods that the base stations may use to dynamically adjust their coverage areas. Additionally, base stations may originate and terminate wireless voice and data calls, perform multi-user detection, exchange and collect information for billing purposes, etc.

Figure 6:
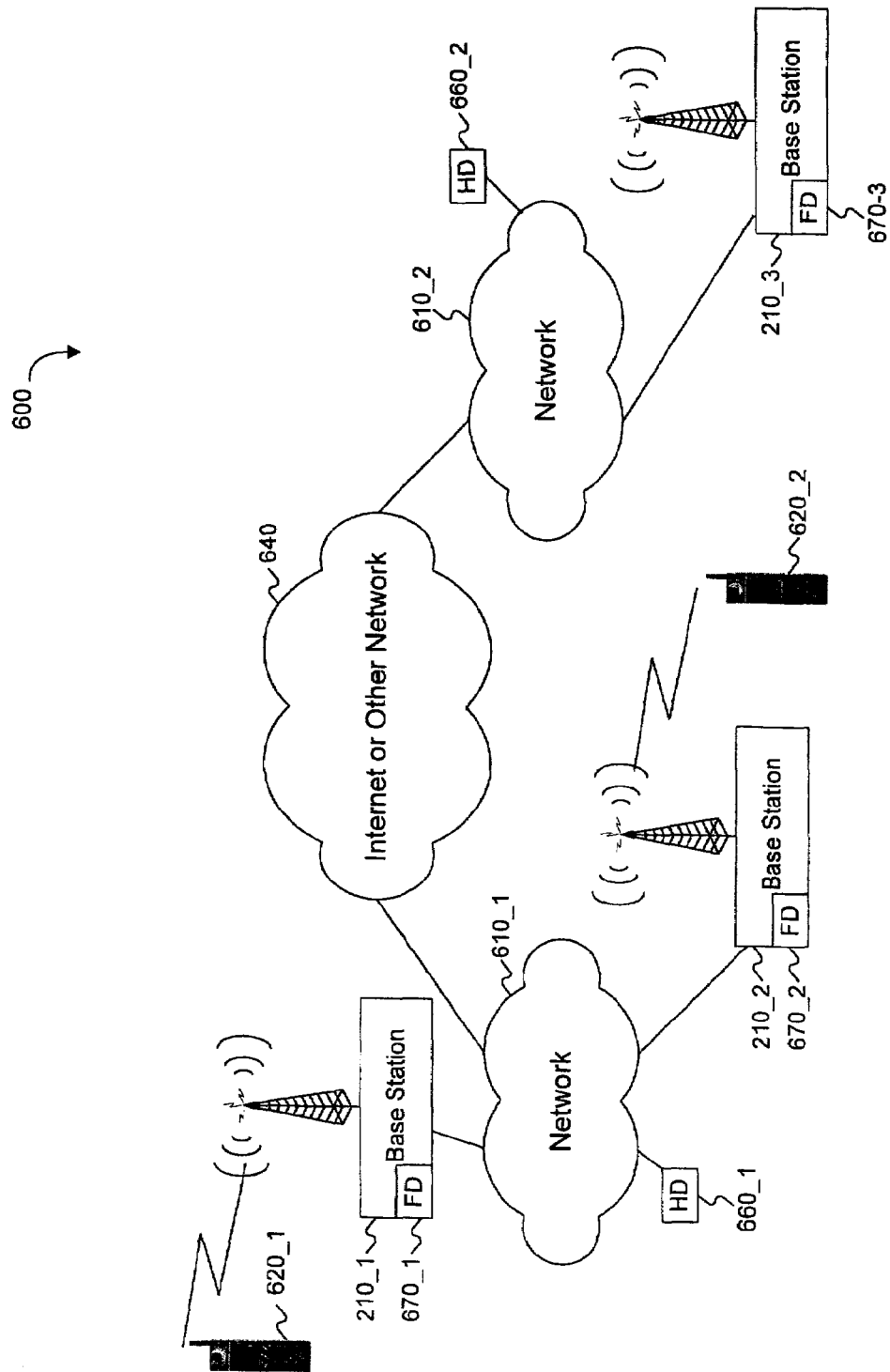
FIG. 6 illustrates a wireless system, in accordance with methods and systems consistent with the invention.

FIG. 6 illustrates a wireless system 600, in accordance with methods and systems consistent with the invention. As illustrated, base station 210_1 and base station 210_2 connect to network 610_1, which in turn connects to a network 640, such as the Internet. Network 610_1 may include a network established by a wireless system provider, such as Bell Atlantic, used to interconnect the wireless system provider's base stations.

Base station 210_3 connects to network 610_2 which in turn connects to network 640. Network 610_2, like network 610_1, is a wireless system provider's network that interconnects the wireless system provider's base stations. The networks 610_1 and 610_2 may belong to the same or different carriers (i.e., they belong to different wireless systems.)

Also, wireless device 620_1 is located within the coverage area of base station 210_1 and wireless device 620_2 is located within the coverage area of base station 210_2. Further, network 610_1 includes a home database 660_1 and network 610_2 includes a home database 660_2. Further, as illustrated, each base station includes a foreign database 670. Home databases 660 may be included in a base station or implemented as a stand alone device.

The home databases 660 and foreign databases 670 may be implemented as Home Location Registers (HLRs) and Visitor Location Registers (VLRs), respectively, such as those used in prior art cellular technology. For a further description of HLRs and VLRs, see V. K. Garg and Joseph E. Wilkes, "Wireless and Personal Communications Systems," Prentice Hall 1996. In another embodiment, the home databases 660 and foreign databases 670 may be implemented as home agents and foreign agents, respectively, such as those used in Mobile IP. For a further description of home agents and foreign agents, see Charles E. Perkins, "Mobile IP Design Principles and Practices," Addison-Wesley, 1998. As is known to one of skill in the art, Mobile IP may be used to support terminals that are connected to IP networks other than their home networks.

Figure 7:
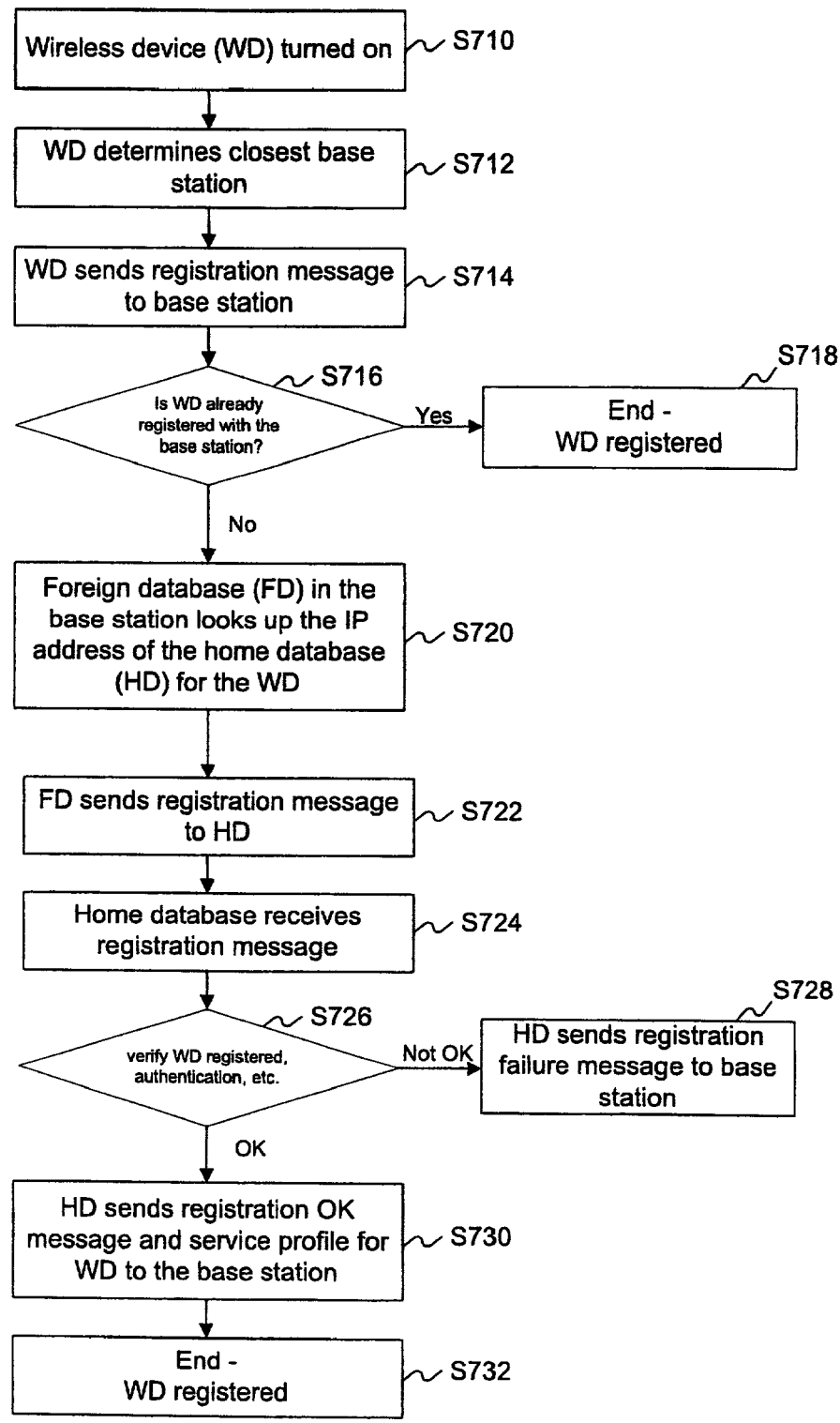
FIG. 7 illustrates a flow chart for registering a wireless device with a base station, in accordance with methods and systems consistent with the invention.

FIG. 7 illustrates a flow chart for registering a wireless device with a base station, in accordance with methods and systems consistent with the invention. This flow chart will be discussed with reference to FIG. 6. First, wireless device 620_1 is turned on (S702). Next, wireless device 620_1 takes measurements and determines if it receives a signal from a base station in the wireless devices 620_1 carrier's network. If so, the wireless device 620_1 determines the closest base station belonging to the carrier's network to which the wireless device subscribes (S704).

If the wireless device cannot locate a base station belonging to its carrier's network, the wireless device 620_1 determines the closest base station belonging to any network. This may occur, for example, if the wireless device is taken to a region in which the carrier does not provide service and thus does not have any base stations. As will be obvious to one of skill in the art, there are numerous mechanisms by which a wireless device can determine the closest base station. In this example, base station 210_1 is the closest base station to wireless device 620_1 and base station 210_1 belongs to the carrier's network to which wireless device 620_1 subscribes.

Next, the wireless device 610_1 sends a registration message to the base station 210_1 (S706). The base station may then determine if the wireless device 620_1 is already registered with the base station 210_1 (S708). This may occur, for example, if the wireless device 620_1 registers with the base station 210_1 and then is turned off and on again without leaving the coverage area of the base station 210_1, or if the base station contains the home database for the wireless device 620_1. If the wireless device 620_1 is already registered with base station 210_1, then the registration process is terminated (S710).

If the wireless device 620_1 is not yet registered with base station 210_1, the foreign database 670_1 may use the IP address of the wireless device 620_1 to look up in a database the IP address of the home database for the wireless device 620_1 (S712). In this example, home database 660_2 is the home database for the wireless device 620_1.

The foreign database 670_1 then sends a registration message to the wireless device's home database 660_2 (S714). The registration message is then forwarded through the networks 630_1, 640, and 630_2 to the home database 660_2 (S716). In response, the home database 660_2 verifies that the wireless device 620_1 is registered with the home database and authenticates the wireless device 620_1 (S718). If there is a problem, such as when the wireless device 620_1 is not registered with the home database 660_2, the home database 660_2 sends a registration failure message to base station 210_1 (S720). Otherwise, the home database 660_2 sends a registration OK message to the base station 210_1 along with the service profile of the wireless device 620_1 (S724). The service profile may include, for example, information on whether the wireless device 620_1 subscribes to call-waiting, caller-ID, 3-way calling, voicemail, etc. so that the base station 210_1 can provide the proper services to wireless device 620_1. The wireless device 620_1 is then registered with base station 210_1 (S726).

Figure 8:
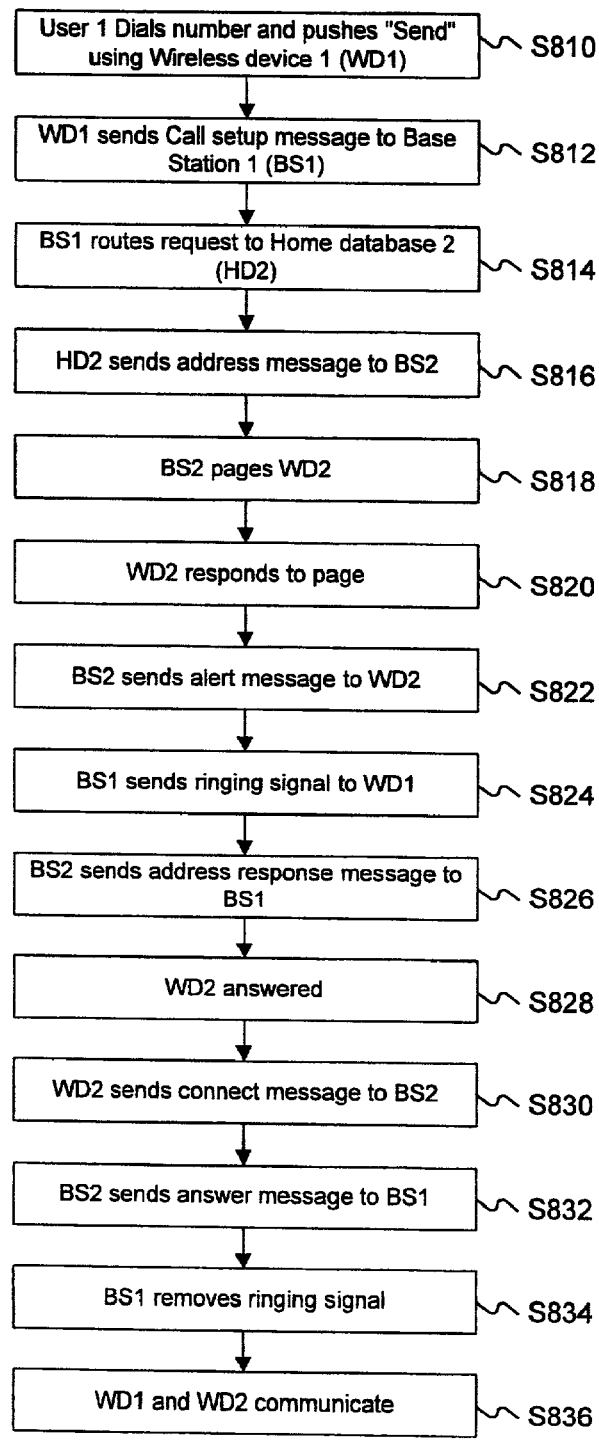
FIG. 8 illustrates a flow chart for setting up a call between two wireless devices, in accordance with methods and systems consistent with the invention.

FIG. 8 illustrates a flow chart of setting up a call between two wireless devices 620_1 and 620_2 when wireless device 620_1 is located outside the coverage area of its carrier's network, in accordance with methods and systems consistent with the invention. This flow chart will be discussed with reference to FIG. 6 wherein wireless device 620_1 is registered with foreign database 670_1 and wireless device 620_2 is registered with foreign database 670_2. Further, in this example, home database 660_2 is the home database for wireless device 620_1 and the home database for wireless device 620_2 is home database 660_1.

The process may be initiated by a user of wireless device 620_1 dialing the number for wireless device 620_2 and then pressing the send button (S810). Wireless device 620_1 then sends a call setup message to base station 210_1 (S812). By examining the phone number or IP address of wireless device 620_2, base station 210_1 then routes the request to the home database 660_1 for the wireless device 620_2 (S814).

Home database 660_1 then determines the base station 210_2 that connects to wireless device 620_2 and sends an address message to base station 210_2 (S816). Base station 210_2 then pages wireless device 620_2 (S818). Wireless device 620_2, in response, sends a response message to base station 210_2 (S820). Base station 210_2 then sends an alert message to wireless device 620_2 (S822). Further, base station 210_2 sends an address response message to base station 210_1 (S824).

After receiving the address response message, base station 210_1 sends a ringing signal to wireless device 620_1 (S826). At some point, a user of wireless device 620_2 may direct the wireless device 620_2 to accept the request to establish communications with wireless device 620_1) (i.e., a user of wireless device 620_2 is the ringing wireless device 620_2) (S828). As will be obvious to one of skill in the art, wireless device 620_2 may not be answered and rather than performing the following steps, the call may be directed to voice mail, to another number, a busy signal may be sent to wireless device 620_1, etc. For this example, it is assumed that wireless device 620_2 is answered.

After being answered, wireless device 620_2 sends a connect message to base station 210_2 (S830). In response, base station 210_2 sends an answer message to base station 210_1 (S832). Base station 210_1 then stops sending the ringing signal to wireless device 620_1 (S834). Then, the users of wireless devices 620_1 and 620_2 may communicate (S836).

Figure 9:
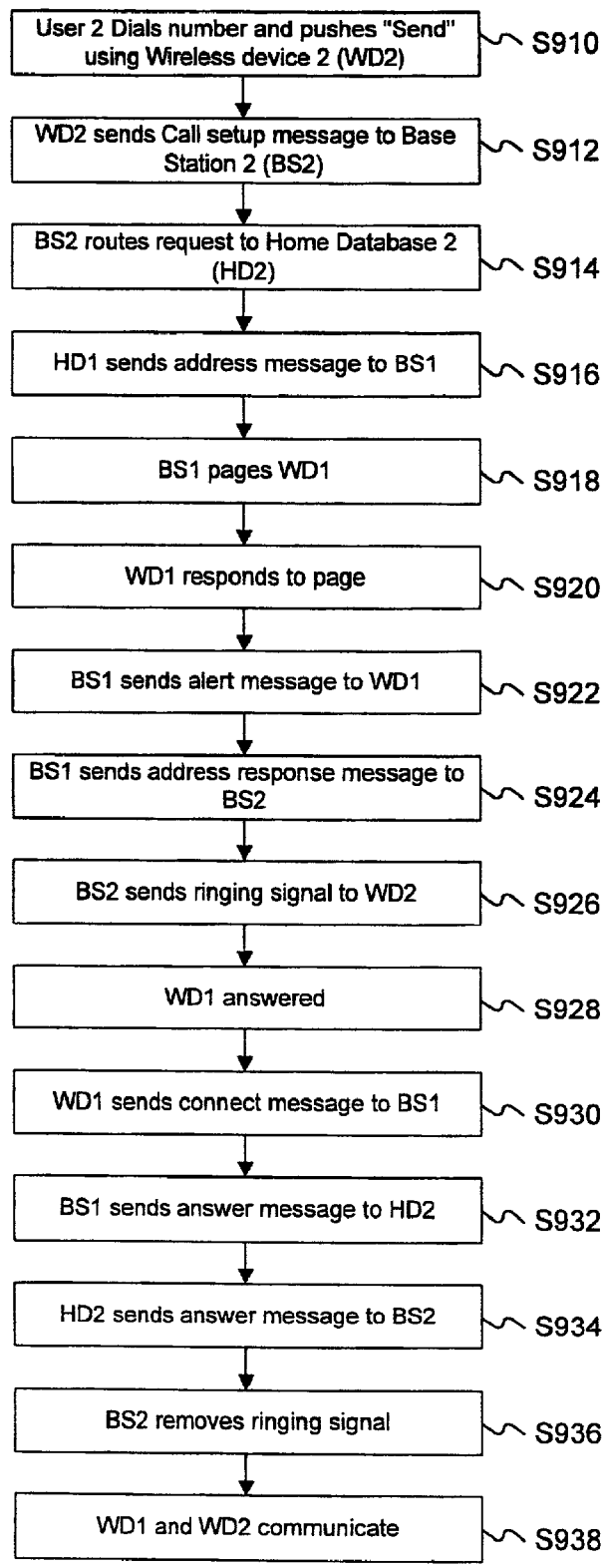
FIG. 9 illustrates a flow chart for setting up communications between two wireless devices, in accordance with methods and systems consistent with the invention.

FIG. 9 illustrates a method for setting up communications between two wireless devices, wherein one of the wireless devices is located outside of its carrier's network, in accordance with methods and systems consistent with the invention. This flow chart will be discussed with reference to FIG. 6. In this example, wireless device 620_1 is located outside its carrier's network and wireless device 620_2 is within its carriers network. Further, in this example, wireless device 620_2 initiates the communications with wireless device 620_1.

The process may be initiated by a user of wireless device 620_2 dialing the number for wireless device 620_1 and then pressing the send button (S910). In response, wireless device 620_2 sends a call setup message to base station 210_2. Base station 210_2 then routes the request to the home database for wireless device 620_1 (S914). In this example, the home database for wireless device 620_1 is home database 660_2. Home database 660_2 then determines that wireless device 620_2 is registered with base station 210_1 and sends an address message to base station 210_1 (S916). Base station 210_1 then pages wireless device 620_1 (S918). Wireless device 620_1 then responds to the page (S920). In response, base station 210_1 sends an alert message to wireless device 620_1, which causes wireless device 620_1 to begin ringing (S922). Further, base station 210_1 sends an address response message to base station 210_2 (S924). In response, base station 210_2 sends a ringing signal to wireless device 620_2 (S926).

At some point, wireless device 620_1 may be directed to accept the request to establish communications with wireless device 620_2 (i.e., wireless device 620_1 is answered) (S928). As discussed above, in certain situations wireless device 620_1 may not accept the request, and instead steps other than those discussed below will be performed. For this example, it is assumed that wireless device 620_1 accepts the request to establish communications.

After being directed to accept the request to establish communication (i.e., answered), wireless device 620_1 sends a connect message to base station 210_1 (S930). Base station 210_1 then sends an answer message to home database 660_2 (S932). In response, home database 660_2 sends an answer message to base station 210_2 (S934). Base station 210_2 then stops sending a ringing signal to wireless device 620_2 (S936). After which, wireless devices 620_1 and 620_2 communicate (S938).

Figure 10:
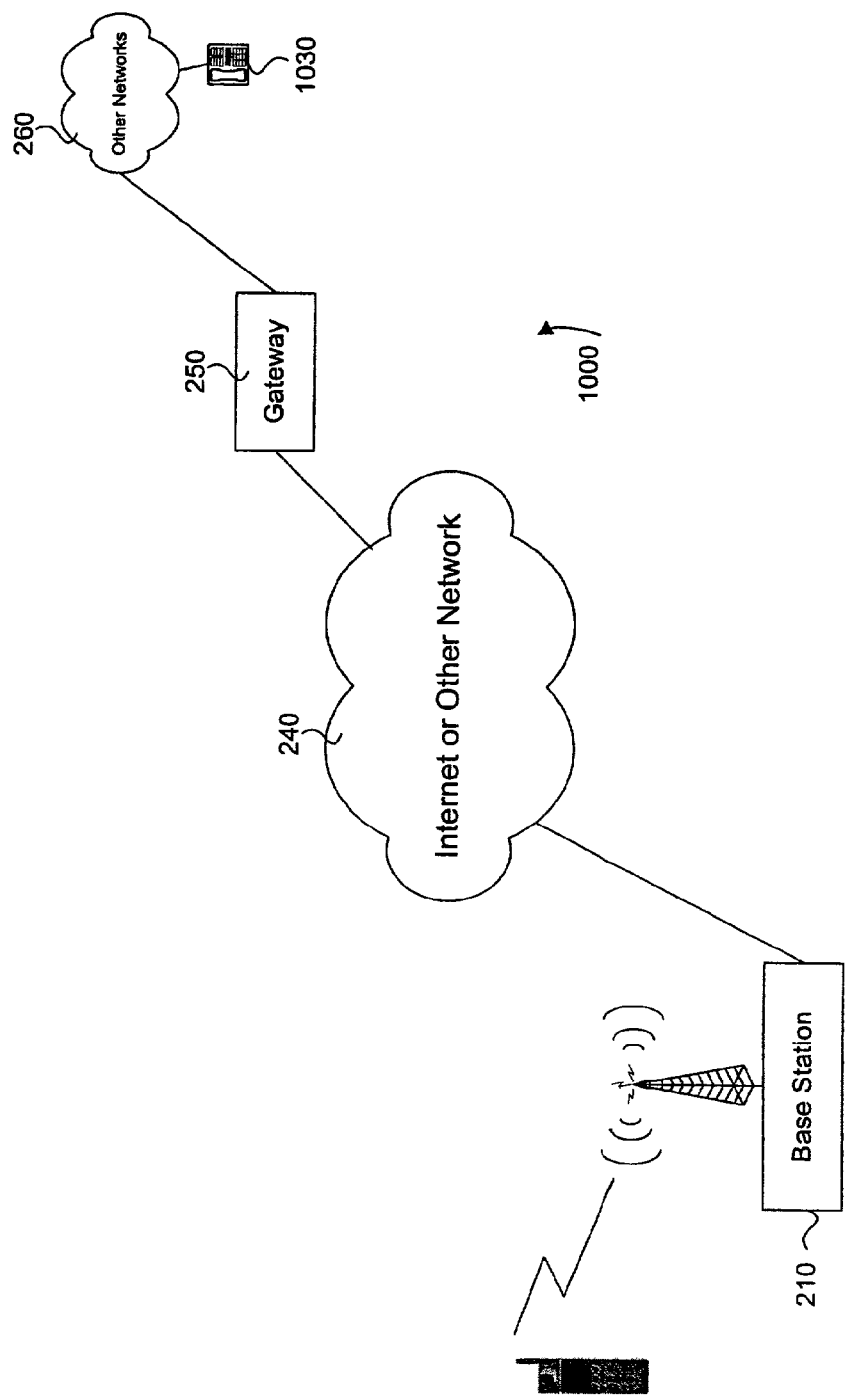
FIG. 10 illustrates a wireless system, in accordance with methods and systems consistent with the invention

FIG. 10 illustrates a wireless system 1000, in accordance with methods and systems consistent with the invention. As illustrated, wireless device 1020 is located in the coverage region for base station 210. Base station 210 connects to network 240, which may include the Internet or any other network. Network 240 also connects to another network 260 through a gateway 250. This other network 260 may include, for example, the Public Switched Telephone Network (PSTN) or any other type of network. Also, a network user element 1030, which connects to network 260, may include, for example, a standard land-line-phone for use with the PSTN. Further, although not shown, base station 210 may connect to network 240 through a subnetwork, such as those illustrated in FIGS. 3 and 6. Further, in this example, base station 210 includes the home database (not shown) for wireless device 1020.

Figure 11:
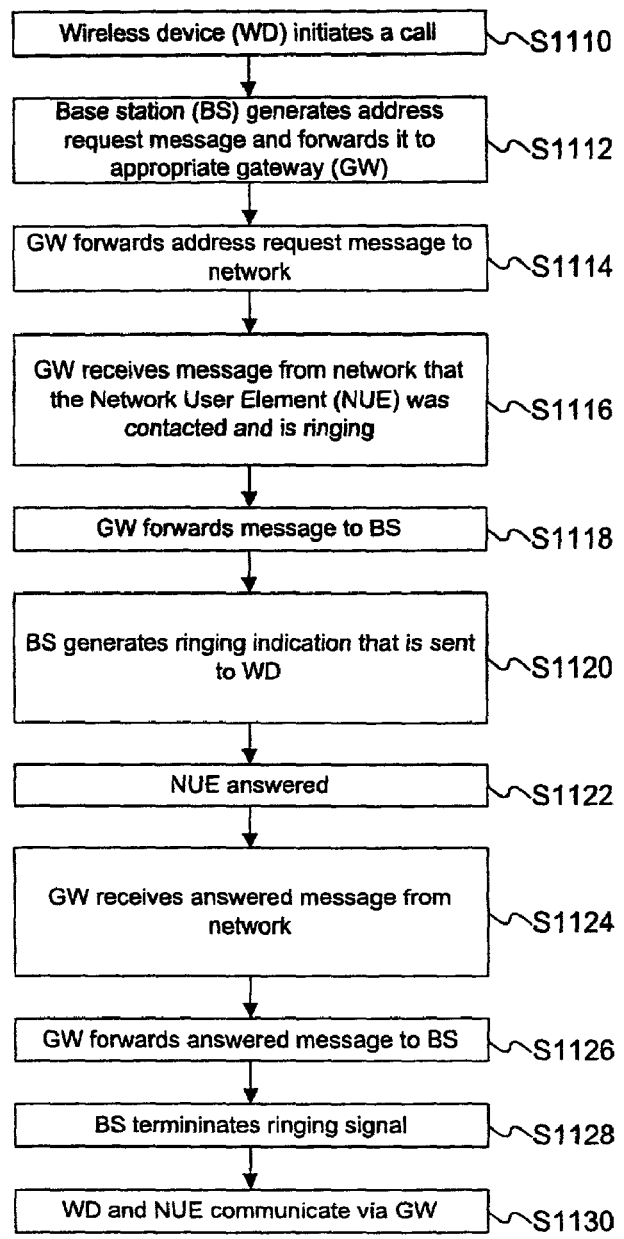
FIG. 11 illustrates a flow chart for setting up communications between a wireless device and a network user element, in accordance with methods and systems consistent with the invention.

FIG. 11 illustrates a flow chart for setting up communications between a wireless device and a network user element belonging to a network other than the wireless system to which the wireless device subscribes, in accordance with methods and systems consistent with the invention. This flow chart will be discussed with reference to FIG. 10.

Wireless device 1020 may initiate a communication by a user dialing the number for the network user element 1030 and pressing the send button (S1110). Base station 210 then receives this request, examines the destination phone number, and generates an address request message that it forwards to gateway 250 through network 240 (S1112). The address message is then received by gateway 240, which forwards the address request message to network 260 (S1114). Because the wireless device 720 and the network 260 may use different protocols, the gateway 250 may need to modify the address request message in accordance with the protocols used by the network 260.

The gateway 250 then waits until it receives a message from the network 260 indicating that a ring signal has been sent to the network user element 1030 (S1116). The gateway 250 then converts this message to the appropriate protocol, if necessary, and forwards the message to the base station 210 (S1118). In response to receiving this message, the base station 210 generates a ring signal that is sent to wireless device 1020 (S1120).

At some point, in this example, a user of network user element 1030 may direct the network user element 1030 to accept the request to establish communications (i.e., the user answers the ringing network user element 1030) (S1122). In certain examples, the network user element 1030 may not accept the request and alternative steps to those discussed below will be performed. For example, the call may be forwarded to another number or the call may be directed to voice mail.

After the network user element 1030 accepts the request (i.e., is answered), the network 250 may forward a message to gateway 250 indicating that the network user element 1030 accepts the request (S1124). The gateway 250 then converts this message to the appropriate protocol, if necessary, and forwards the message to base station 210 (S1126). In response, base station 210 stops sending the ring signal to wireless device 1020 (S1128). The wireless device 1020 and network user element 1030 may then communicate through gateway 250 (S1130).

Figure 12:
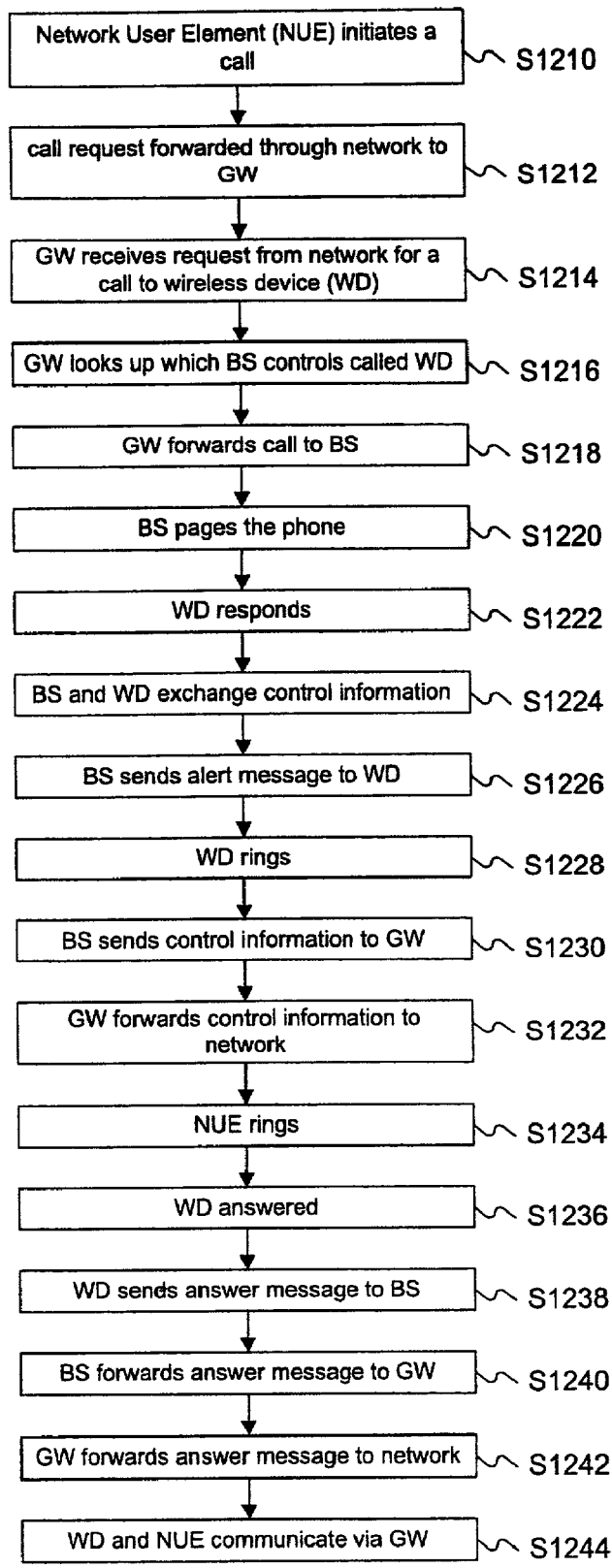
FIG. 12 illustrates a flow chart for setting up communications between a wireless device and a network user element, in accordance with methods and systems consistent with the invention.

FIG. 12 illustrates a flow chart setting up communications between a wireless device and a network user element belonging to a network other than the wireless system to which the wireless device subscribes, in accordance with methods and systems consistent with the invention. This flow chart will be discussed with reference to FIG. 10. Further, in this example, the communications are initiated by network user element 1030.

Network user element 1030 may initiate a communication by a user dialing a number for wireless device 1020 (S1210). The network 260 may then forward this message to gateway 250 in accordance with the network's protocols (S1212). The gateway 250 then receives the message and converts it to a protocol for the wireless system if necessary (S1214). The gateway 250 may look up in a database the IP address for the base station 210 to which the wireless device 1020 is presently connected (S1216). In this example, base station 210 includes the home database for wireless device 1020. If the wireless device connects to a base station other than the base station including its home database, additional steps may be necessary for locating the base station to which the wireless device 1020 connects.

After determining the base station 210 to which the wireless device 1020 connects, the gateway forwards the request to base station 210 (S1218). In response, the base station 210 pages the wireless device 1020 (S1220). The wireless device 1020 then responds to the page (S1222). The wireless device 1020 in certain circumstances may not respond to the page. For example, the wireless device 1020 may be turned off. If the wireless device 1020 does not respond to the page, different steps than those discussed below will be performed.

After the wireless device 1020 responds to the page, the wireless device 1020 and the base station 210 exchange control information regarding the radio channel parameters the wireless device 1020 will use (S1224). The base station 210 may then send an alert message to the wireless device 1020 (S1226). In response, the wireless device 1020 begins ringing (S1228). Further, the base station 210 sends control information, such as, an address complete message, to the gateway 250 (S1230). The gateway 250 then forward the control information to the network 260 (S1232). The gateway 250 may convert the information to the protocol used by network 260 prior to forwarding the control information. The network then may send a ringing signal to the network user element 1030 (S1234).

Then, a user of wireless device 1020 may direct the wireless device 1020 to accept the request to establish communications (i.e., the user answers the ringing wireless device 1020) (S1236). In this example it is assumed that wireless device 1020 accepts the request. Alternatively, wireless device 1020 may not be answered and different steps than those discussed below may be performed.

After the wireless device 1020 is answered, the wireless device 1020 sends an answer message to base station 210 (S1238). Base station 210 then forwards the answer message to gateway 250 (S1240). Gateway 250 then converts the answer message to an appropriate protocol for the network 260, if necessary, and forwards the answer message to network 260 (S1242). The network 260 then stops sending the ring signal to network user element 1030 and the wireless device 1020 and network user element 1030 may communicate with each other (S1242).

Further, in addition to supporting communications between two or more wireless devices and between wireless devices and network user elements, such as phones connected to the PSTN, the above discussed system may support communications between a wireless device and a voice over IP (VOIP) network element. The VOIP network element may be a VOIP phone, a computer capable of providing VOIP services, or any other type of device capable of providing VOIP services.

Figure 13:
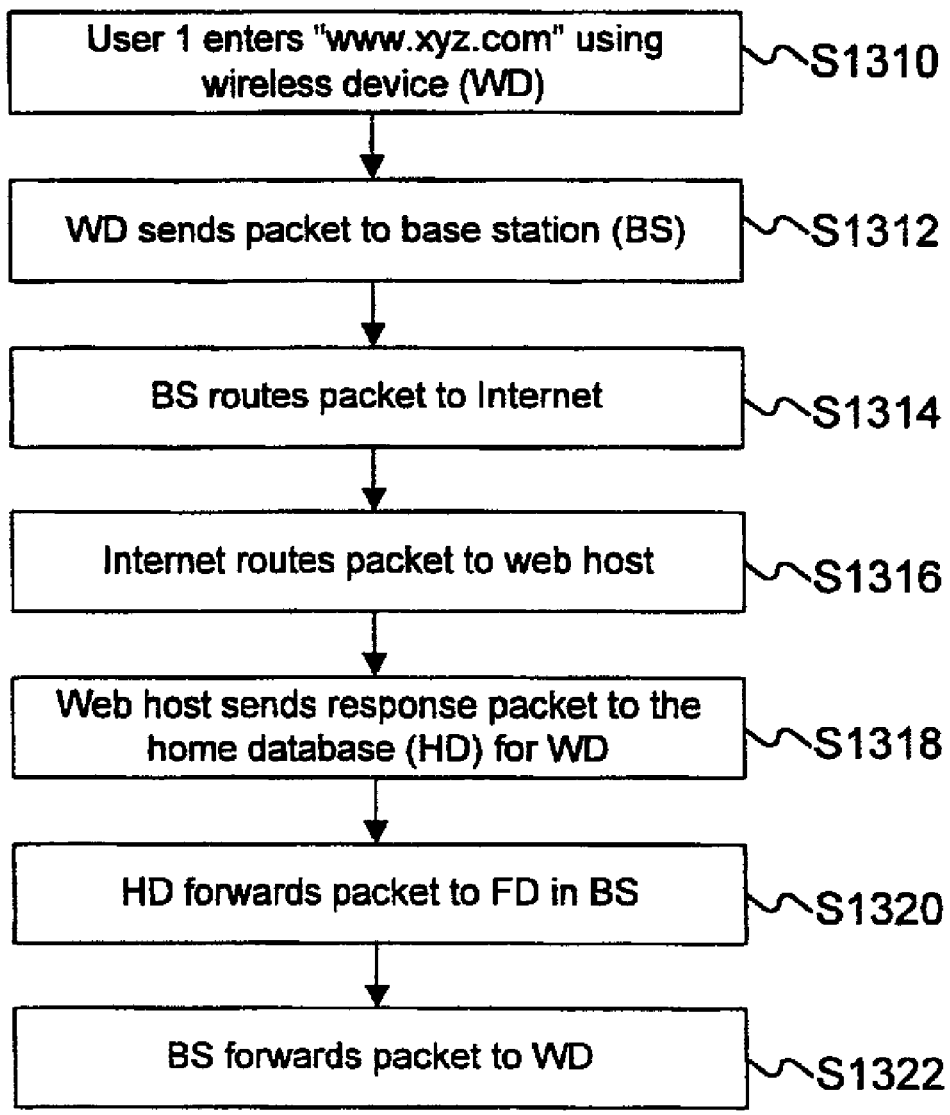
FIG. 13 illustrates a flow chart for using a wireless device to connect to and receive information from a web server, in accordance with methods and systems consistent with the invention.

Further, the above discussed system may support communications between a wireless device and a network element, such as a web server. For example, a user may use a wireless device as a web browser to connect to and receive information from a web page. FIG. 13 illustrates a flow chart for using a wireless device to connect to and receive information from a web server, in accordance with methods and systems consistent with the invention. This method will be discussed with reference to previously discussed FIG. 6. In this example, wireless device 620_1 is registered with foreign database 770_1 and the home database for wireless device 620_1 is home database 660_2.

A user may use the wireless device 620_1 as a web browser and enter a domain name for a web page, such as the web page "www.xyz.com" (S1310). The wireless device 620_1 then forwards a packet including the request to access the web page to base station 210_1 (S1312). Base station 210_1 then routes the packet to the network 240 through network 630_1 (S1314). The network 240 then routes the packet to the server (not shown) hosting the web page "www.xvz.com" (S1316). The server (not shown) sends a response packet to the wireless device's home database 660_2 (S1318). The home database 660_2 then forwards the packet to the foreign database 670_1 in base station 210_1 (S1320). The base station 210_1 then sends the packet to wireless device 620_1 (S1322). Additional packets may be transferred between the wireless device 620_1 and the server (not shown) using the above described steps.

Wireless devices because of their mobile nature may move from the coverage area of one base station to the coverage area for another base station. These coverage areas are commonly called cells. Various techniques exist for handing off a wireless device from one base station to another base station. These techniques include soft handover and hard handover. In hard handover, a wireless device moving from one cell to another cell is added to the new cell at the same time they are dropped from the initial cell.

In soft handover, a wireless device is simultaneously connected to several base stations such that the transmission power can be controlled according to the base station from which the wireless device receives the most powerful signal. This minimizes a wireless device's transmission power and reduces interference into other cells.

In prior art wireless systems, in soft handover, a wireless device takes measurements on its serving base station and neighboring base station and reports these measurements to its serving base station. The serving base station is the base station controlling the handover process. The serving cell then forwards these measurements to a central location, such as the base station controller (BSC) or mobile station controller (MSC). The BSC coordinates the soft handover when the two base stations involved in the soft handover are located within the same BSC. The MSC coordinates the soft handover when the two base stations belong to different BSCs. The BSC (or MSC) then decides if the wireless device should be connected to an additional base station. If the wireless device simultaneously connects to two base stations, the BSC (or MSC) forwards any incoming traffic for the wireless device to both base stations. Similarly, any traffic sent by the wireless device is received by both base stations and forwarded to the BSC (or MSC). The BSC (or MSC) then combines the two signals and forwards the result to its destination.

In one embodiment, each base station is an autonomous standalone entity. Consequently, base stations need to exchange information about wireless devices to handle soft handover.

Figure 14:
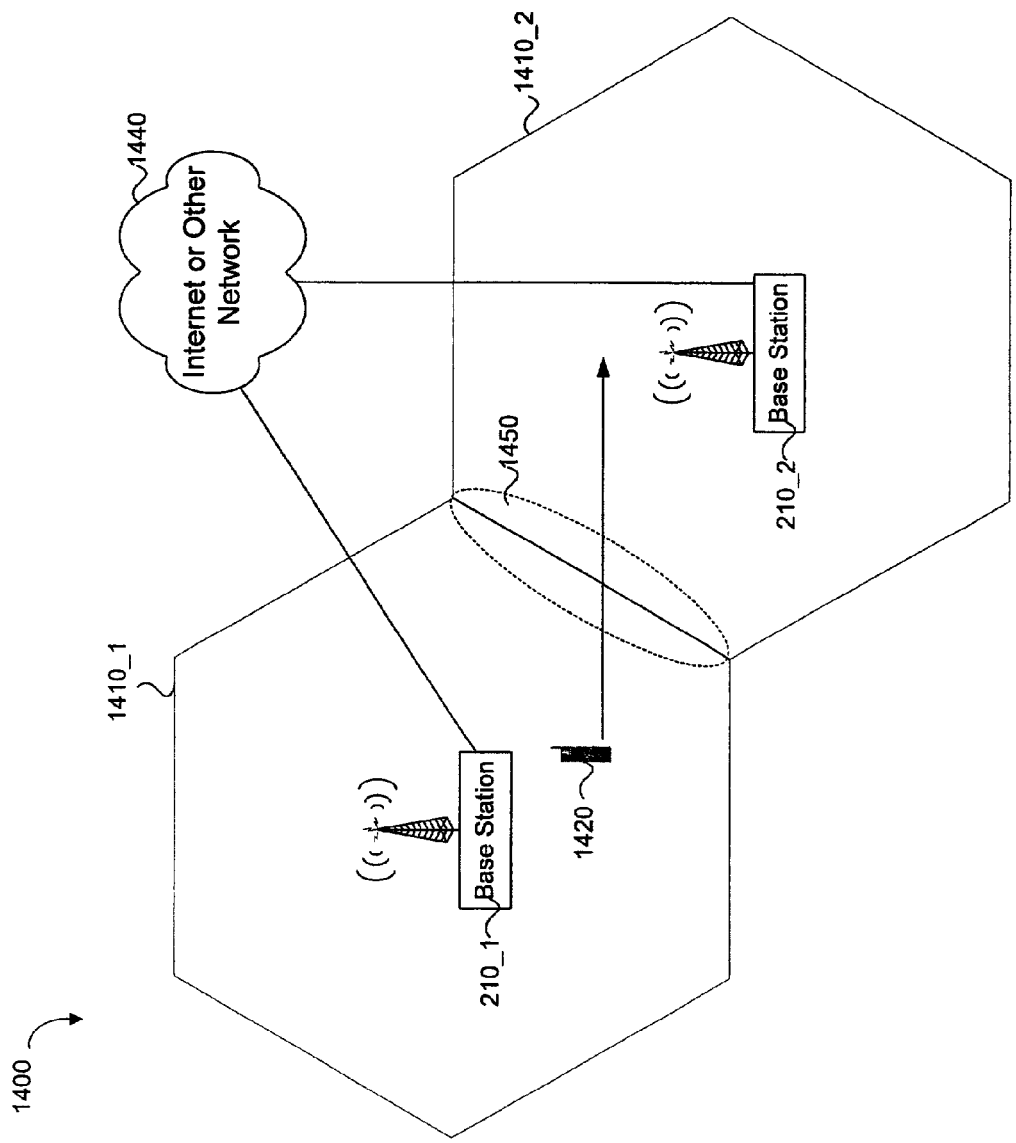
FIG. 14 illustrates a wireless system, in accordance with methods and systems consistent with the invention.

FIG. 14 illustrates a wireless system 1400, in accordance with methods and systems consistent with the invention. This figure, in conjunction FIGS. 15 and 16 described below will be used to explain an exemplary method for performing soft handover. These methods require no change to the current 3GPP W-CDMA User Equipment Architecture and Air Interface (1999 release). Consequently, existing mechanisms, such as soft handover measurements need not be modified.

As illustrated in FIG. 14, a wireless device 1420 in cell 1410_1 is moving into cell 1410_2. Also, base station 210_1 provides communications for wireless devices in cell 1410_1 and base station 210_2 provides communications for wireless devices in cell 1410_2. Further, base station 210_1 and 210_2 connect to a network 1440. As discussed above, the base stations may connect directly to network 1440 or may connect to network 1440 through one or more subnetworks.

Figure 15:
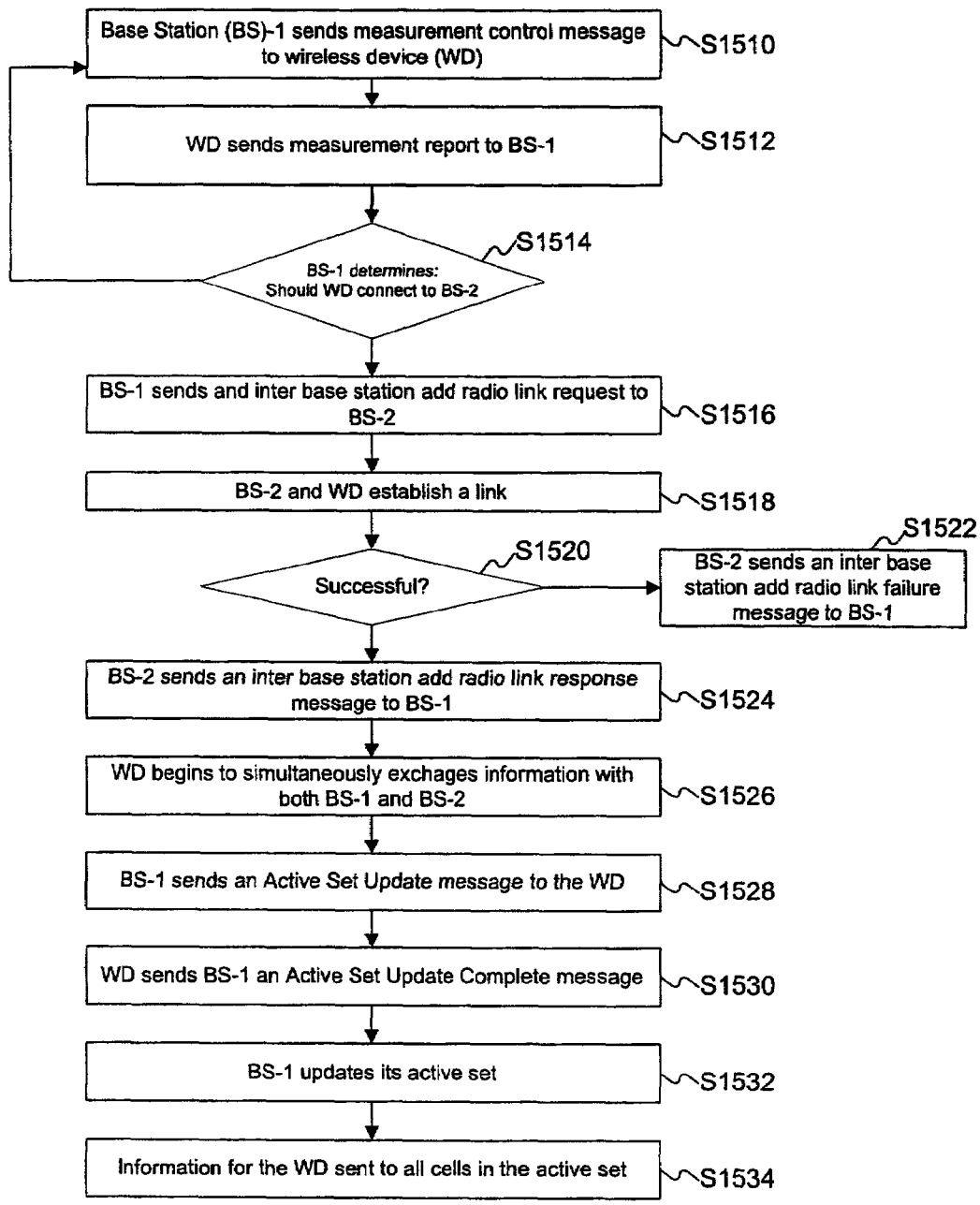
FIG. 15 illustrates a flow chart of a soft handover method when adding a wireless device to an active set, in accordance with methods and systems consistent with the invention.

FIG. 15 illustrates a flow chart for a soft handover method when adding a wireless device to an active set, in accordance with methods and systems consistent with the invention. An active set is the set of base stations with which a wireless device actively communicates. For example, wireless device 1420 is illustrated as initially in cell 1410_1. Thus, in this example, the active set for wireless device 1420 initially includes only base station 210_1.

Both the wireless device 1420 and each of the base stations in the active set for wireless device 1420 may store the active set for wireless device 1420. Thus, in this example, the active set for wireless device 1420 is stored by both base station 210_1 and wireless device 1420. Thus, initially base station 210_1 is the serving base station for wireless device 1420.

Base station 210_1 first sends a measurement control message to the wireless device 1420 to trigger soft handover measurements (S1510). The measurement control message can specify periodic measurement reporting or measurement reporting triggered by a threshold. This message may correspond to W-CDMA standards.

Upon receiving this message, wireless device 1420 prepares and sends a measurement report to base station 210_1 (S1512). This report may include the common pilot channel (CPICH) signal level of the wireless devices 20 serving base station 210_1 and neighboring base stations 210_2.

Base station 210_1 then examines this report and determines whether or not wireless device 1420 should be added to the active set for another base station (S1514). If not, the process returns to step S1510.

In this example, wireless device 1420 is moving towards cell 1410_2 and at some point enters a region 1450 where the base station 210_1 determines that wireless device 1420 should add base station 210_2 to the active set for. After determining that base station 210_2 needs to be added to the active set for wireless device 1420, base station 210_1 sends an add radio link request message to base station 210_2 (S1516). The add radio link request message may include radio link configuration information, parameters common to all base station involved in the soft handover, and power control information. Depending on the synchronization method chosen, this message may also include synchronization information if synchronization between the two base stations has not yet been performed.

In response, base station 210_2 contacts wireless device 1420 and establishes a communications link with wireless device 1420 (S1518). Base station 210_2 then determines whether or not a communications link was successfully established with wireless device 1420 (S1520). If not, base station 210_2 sends an add radio link failure message to base station 210_1 (S1522). When failure occurs, base station 210_1 may try again at a later time.

If a communication link was successfully established between base station 210_2 and wireless device 1420, base station 210_2 sends an add radio link response message to base station 210_1 (S1524). This message may include parameters specific to the new channel setup between wireless device 1420 and base station 210_2. At this point, wireless device 1420 may simultaneously communicate with base station 210_1 and base station 210_2 (S1526).

Upon receipt of an add radio link response message from base station 210_2, base station 210_1 sends an active set update message to wireless device 1420 (S1528). This message may include parameters relevant to the new communication link between base station 210_2 and wireless device 1420. In response, wireless device 1420 adds base station 210_2 to the active set and sends an active set update complete message to base station 210_1 (S1530). Upon receipt of the active set update complete message, base station 210_1 updates the active set for wireless device 1420. Further, user information may be sent to all base stations included in the active set for the wireless device 1420 (S1532) Thus, at this point wireless device 1420 is simultaneously communicating with base station 210_1 and base station 210_2. Further, any information coming from the network 1440 for wireless device 1420 is sent to the serving base station 210_1 for wireless device 1420. Base station 210_1 then forwards this information to all base stations included in the active set.

Base station 210_1 may also include in this information a frame number at which all base stations in the active set for wireless device 1420 should send information to wireless device 1420. Synchronization among cells may be performed according to well-known synchronization techniques. Thus, all base station included in the active set for wireless device 1420 can simultaneously send the information to the wireless device 1420. Similarly, all base stations included in the active set for wireless device 1420 receive the same information sent from wireless device 1420. Each base station in the active set for wireless device 1420 other than the serving base station 210_1 then forwards this information to the serving base station 210_1. The serving base station 210_1 then combines the received information and its own information and sends it to the network 1440.

Figure 16:
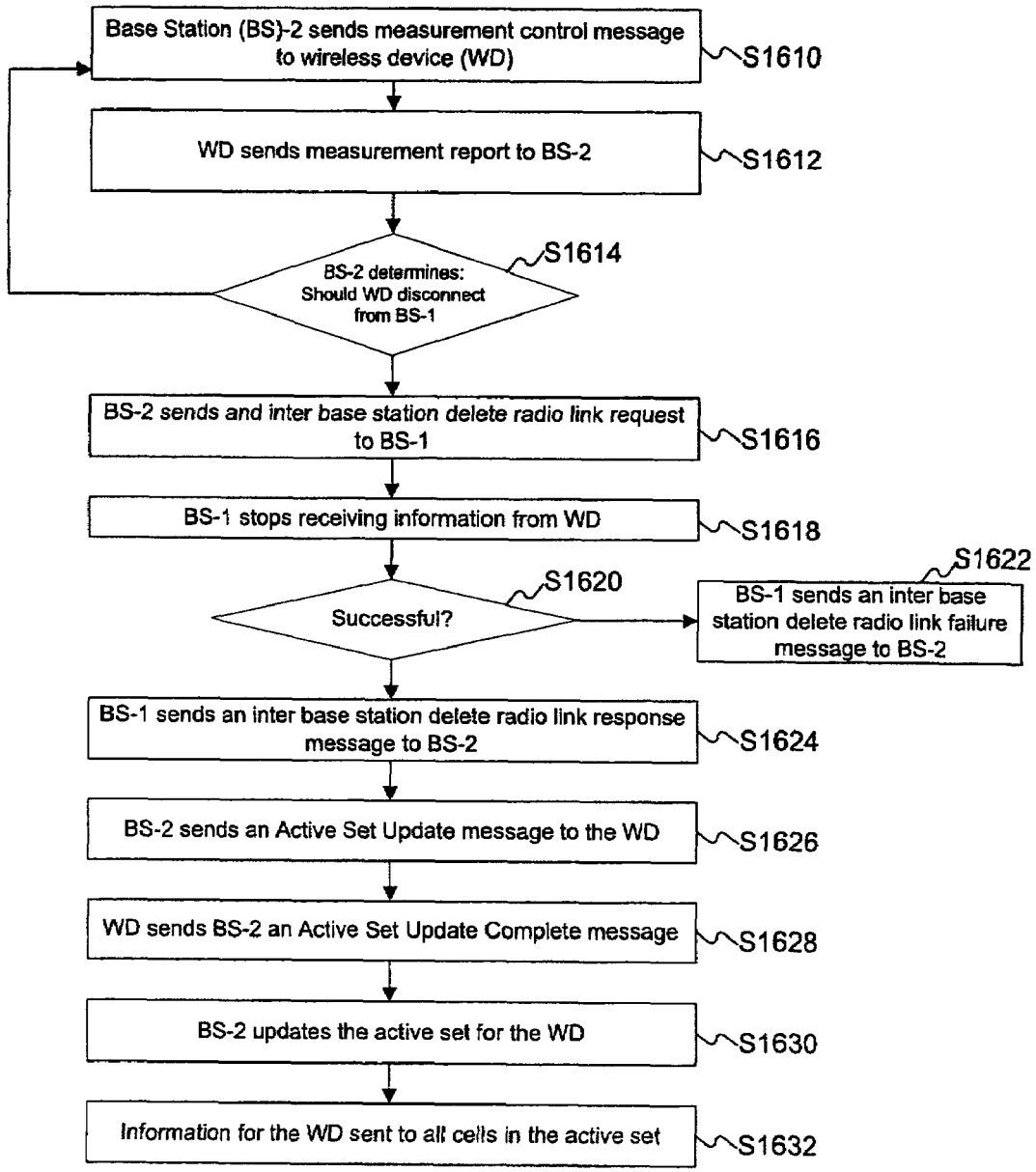
FIG. 16 illustrates a flow chart of a soft handover method when removing a base station from the active set, in accordance with methods and systems consistent with the invention.

In addition to adding a base station to the active set for a wireless device, it may be necessary to also remove base stations from the active set. For example, as wireless device 1420 moves further into cell 1410_2, it may be desirable to remove base station 210_1 from the active set for wireless device 1420. FIG. 16 illustrates an exemplary soft handover method when removing a base station from the active set, in accordance with methods and systems consistent with the invention. In this example, it is assumed base station 210_2 is the serving base station for wireless device 1420. The serving base station is the base station where the call started. If the serving base station is removed from the active set, the serving base station may designate another base station to take over serving base station functions.

As illustrated, the base station 210_2 sends measurement control messages to wireless device 1420 (S1610) directly and via other base stations in the active set. In response, as discussed above, the wireless device 1420 sends a measurement report to base station 210_2 (S1612). The base station 210_2 then determines whether to add a base station to the active set for the wireless device 1420 (as discussed above) or delete a base station from the active set for the wireless device 1420 (S1614). If the base station 210_2 determines that neither is necessary, the process returns to step 1610.

In this example, wireless device 1420 has moved completely into cell 1410_2 such that base station 210_2 determines that base station 210_1 should be removed from the active set for wireless device 1420. Base station 210_2 then sends a base station delete message to base station 210_1 (S1616). This message may include the information required to delete the specified communication link, such as, wireless device identification. On receipt of this message, base station 210_1 stops demodulating information from wireless device 1420 (S1618). Base station 210_1 then determines whether this operation was successful (S1620). If not, base station 210_1 sends a delete radio link failure message to base station 210_2 (S1622).

If base station 210_1 determines that it successfully deleted the communication link, base station 210_1 sends a delete radio link response message to base station 210_2 (S1624). On receipt of the delete radio link response message, base station 210_2 sends an active set update message to wireless device 1420 (S1628). Wireless device 1420 then updates its active set and sends an active set complete message to base station 210_2 (S1630).

Upon receipt of the active set complete message, base station 210_2 updates the active set for wireless device 1420 (S1632). Base station 210_2 then sends information to all other base stations in the active set for wireless device 1420 to inform them that base station 210_1 was deleted from the active set for wireless device 1420 (S1632). In this example, only base station 210_2 remains in the active set for wireless device 1420. Thus, base station 210_2 need not perform this final step.

While it has been illustrated and described what is at present considered to be the preferred embodiment and methods of the present invention, it will be understood by those skilled in the art that various changes and modifications may be made, and equivalents may be substituted for elements thereof without departing from the true scope of the invention. Therefore it is intended that the invention not be limited to the particular embodiments and methods disclosed herein, but the invention includes all embodiments falling within the scope of the appended claims.

What is claimed:

1. A method for communicating in a system that includes at least a first base station connected to a packet network, the first base station serving a first cell, said method comprising:
   connecting a second base station to the packet network;
   the second base station automatically identifying the first base station;
   receiving, at the first base station, communications from a wireless device in the first cell served by the first base station; and
   handing off the wireless device from the first cell to a second cell served by the second base station by a two way exchange of information between the first base station and the second base station.

2. The method of claim 1, further comprising:
   the first base station and the second base station exchanging information over the packet network to determine a coverage area for the second cell served by the second base station.

3. The method of claim 1, wherein the step of the second base station identifying the first station includes:
   the second base station transmitting to a carrier database a message requesting addresses for other base stations connected to the packet network;
   the carrier database transmitting an address for the first base station to the second base station; and
   the second base station transmitting a message to the first base station using the address for the first base station.

4. The method of claim 3, further comprising:
   the second base station transmitting a message to a central database requesting an address for the carrier database; and
   the central database, in response to receiving the message from the second base station, transmitting an address for the carrier database to the second base station.

5. The method of claim 1, wherein the step of the second base station identifying the first base station includes:
   the second base station transmitting a broadcast message on the packet network; and
   the first base station transmitting a reply message to the second base station in response to receiving the broadcast message.

6. The method of claim 1, wherein the wireless device includes a computer.

7. The method of claim 6, wherein the computer includes a personal digital assistant (PDA).

8. The method of claim 1, wherein the wireless device uses the mobile Internet protocol (IP) to send the communication to the first base station.

9. The method of claim 1, wherein the first base station connects to the packet network via an Ethernet compatible interface.

10. A system, comprising:
    a first base station that controls communications with one or more wireless devices in a first cell;
    a second base station that controls communications with one or more wireless devices in a second cell; and
    a packet network connecting the first base station and the second base station;
    wherein the first base station automatically identifies the second base station after being connected to the packet network; and wherein the first base station and the second base station engage in a two way information exchange over the network to hand off one or more of the wireless devices in the first cell from the first cell to the second cell.

11. The system of claim 10, wherein the first base station is further capable of engaging in a two way exchange of information with the second base station to determine a coverage area for the first cell.

12. The system of claim 10, wherein the first base station further transmits to a carrier database a message requesting addresses for other base stations connected to the packet network, receives from the carrier database an address for the second base station, and transmits a message to the second base station using the address for the second base station.

13. The system of claim 12, wherein the second base station further transmits a message to a central database requesting an address for the carrier database, receives from the central database the address for the carrier database, and transmits a message to the carrier database using the address for the carrier database.

14. The system of claim 10, wherein the first base station further transmits a broadcast message on the packet network, and receives a reply message from the second base station in response to the broadcast message.

15. The system of claim 10, wherein at least one of the wireless devices includes a cellular phone.

16. The system of claim 10, wherein at least one of the wireless devices includes a computer.

17. The system of claim 16, wherein the computer includes a personal digital assistant (PDA).

18. The system of claim 10, wherein the wireless device communicates with the first base station using mobile internet protocol (IP).

19. The system of claim 10, wherein the first base station connects to the packet network via an Ethernet compatible interface.

20. A base station for communicating with a wireless device, comprising:
   a network interface that connects to a packet network;
   an antenna interface that connects to an antenna for communicating with one or more wireless devices in a first cell served by the base station;
   a memory that includes:
      a program for automatically identifying other base stations, and
      a program for engaging in a two way information exchange with one of the other base stations to hand off, from the first cell to a second cell served by the other base station, one or more of the wireless devices in the first cell; and
   a processor that executes the program.

* * * * *

UNITED STATES PATENT AND TRADEMARK OFFICE
CERTIFICATE OF CORRECTION

| | | |
|---|---|---|
| PATENT NO. | : 7,272,121 B2 | Page 1 of 1 |
| APPLICATION NO. | : 09/963844 | |
| DATED | : September 18, 2007 | |
| INVENTOR(S) | : Joseph E. Wilkes and Paul G. Zablocky | |

It is certified that error appears in the above-identified patent and that said Letters Patent is hereby corrected as shown below:

ON TITLE PAGE, please insert Item

--Related U.S. Application Data:
(63)  Continuation-in-part of application No. 09/884,649, filed June 19, 2001, now U.S. Pat. No. 6,708,036 and application No. 09/884,637, filed Jun. 19, 2001, now U.S. Pat. No. 6,771,934.--

Column 1, Line 7, delete "The" and insert --This application is a continuation-in-part of the--.

Column 1, Line 15 insert --which-- after "and".

Signed and Sealed this

Twentieth Day of October, 2009

David J. Kappos
*Director of the United States Patent and Trademark Office*